(12) United States Patent
Stirling et al.

(10) Patent No.: US 11,689,473 B2
(45) Date of Patent: Jun. 27, 2023

(54) PRE-ALLOCATING RESOURCES WITH HIERARCHY-BASED CONSTRAINTS

(71) Applicant: Oracle International Corporation, Redwood Shores, CA (US)

(72) Inventors: Jonathan Thomas Stirling, Lone Tree, CO (US); Maria Leonor Caballero Ruiz, Denver, CO (US); Scott Gene Buss, Centennial, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/938,719

(22) Filed: Jul. 24, 2020

(65) Prior Publication Data

US 2022/0029931 A1    Jan. 27, 2022

(51) Int. Cl.
*G06F 15/16* (2006.01)
*H04L 47/78* (2022.01)
*H04L 41/0604* (2022.01)
*H04L 47/70* (2022.01)
*H04L 47/762* (2022.01)

(52) U.S. Cl.
CPC ........ *H04L 47/782* (2013.01); *H04L 41/0627* (2013.01); *H04L 47/762* (2013.01); *H04L 47/788* (2013.01); *H04L 47/822* (2013.01)

(58) Field of Classification Search
CPC .................................................. H04L 47/782
See application file for complete search history.

(56) References Cited

U.S. PATENT DOCUMENTS

| | | | | |
|---|---|---|---|---|
| 6,549,521 B1 * | 4/2003 | Edwards | ............. | G06K 9/6282 370/255 |
| 6,675,229 B1 * | 1/2004 | Bruno | ................... | G06F 9/5055 719/331 |
| 7,032,186 B1 * | 4/2006 | Gasser | ................. | G06F 3/0481 707/999.102 |
| 7,711,789 B1 * | 5/2010 | Jnagal | ................... | G06F 3/0659 711/147 |
| 8,190,593 B1 * | 5/2012 | Dean | ..................... | G06F 16/951 707/707 |
| 8,793,489 B2 * | 7/2014 | Polunin | ................. | G06F 21/604 713/166 |
| 9,742,688 B2 * | 8/2017 | Islam | ...................... | H04L 47/70 |
| 10,409,649 B1 * | 9/2019 | Young | .................. | G06F 9/5083 |

(Continued)

*Primary Examiner* — Hieu T Hoang
(74) *Attorney, Agent, or Firm* — Kilpatrick Townsend & Stockton LLP

(57) ABSTRACT

In a resource-pooling system, predictions can be made as to when and how resources may be needed by particular processes in the system. Requests can be made preemptively to client systems to pre-allocate resources such that resources are ready to use when needed. Client systems can submit constraints on how particular resources may be used by the system. In order to efficiently evaluate these constraints, the system may be organized into a hierarchy of groups, subsystems, and processes, and the constraints may be formulated to match this hierarchy. When resources need to be allocated, constraints may be evaluated using an algorithm that traverses levels of the hierarchy to quickly identify pre-allocations that are available for a particular process based on its location in the system hierarchy.

20 Claims, 18 Drawing Sheets

(56) References Cited

U.S. PATENT DOCUMENTS

| | | | | |
|---|---|---|---|---|
| 10,554,782 B2* | 2/2020 | Fawcett | | G06F 9/4881 |
| 2005/0262362 A1* | 11/2005 | Patrick | | H04L 63/0263 |
| | | | | 713/193 |
| 2006/0041444 A1* | 2/2006 | Flores | | G06Q 10/06 |
| | | | | 379/265.05 |
| 2006/0190482 A1* | 8/2006 | Kishan | | G06F 9/5027 |
| 2006/0193006 A1* | 8/2006 | Lawrence | | G06F 3/1206 |
| | | | | 358/1.16 |
| 2006/0236381 A1* | 10/2006 | Weeden | | H04L 63/101 |
| | | | | 726/6 |
| 2009/0300614 A1* | 12/2009 | Shimogawa | | G06F 9/5088 |
| | | | | 718/1 |
| 2010/0257206 A1* | 10/2010 | Brown | | G06F 21/6218 |
| | | | | 707/784 |
| 2012/0117123 A1* | 5/2012 | Geagan, III | | H04L 9/0836 |
| | | | | 707/797 |
| 2013/0046906 A1* | 2/2013 | Ripberger | | G06F 3/0631 |
| | | | | 710/12 |
| 2014/0082201 A1* | 3/2014 | Shankari | | H04L 47/70 |
| | | | | 709/226 |
| 2015/0089040 A1* | 3/2015 | Mares | | H04L 41/5045 |
| | | | | 709/223 |
| 2015/0103821 A1* | 4/2015 | Gilson | | H04L 47/76 |
| | | | | 370/360 |
| 2015/0188840 A1* | 7/2015 | Xiao | | G06F 9/50 |
| | | | | 709/226 |
| 2015/0200867 A1* | 7/2015 | Dutta | | H04L 49/3045 |
| | | | | 709/226 |
| 2015/0212856 A1* | 7/2015 | Shanmuganathan | | |
| | | | | G06F 9/5077 |
| | | | | 709/226 |
| 2016/0092817 A1* | 3/2016 | Graham | | G06F 8/34 |
| | | | | 705/7.26 |
| 2016/0253215 A1* | 9/2016 | Fang | | G06F 9/50 |
| | | | | 718/104 |
| 2016/0344798 A1* | 11/2016 | Kapila | | H04L 67/141 |
| 2018/0331927 A1* | 11/2018 | Eberlein | | H04L 41/22 |
| 2019/0004870 A1* | 1/2019 | Filachek | | G06F 11/302 |
| 2019/0050302 A1* | 2/2019 | Juniwal | | G06F 3/0604 |

* cited by examiner

Pre-Allocated Resource Table 520

System Name: System 1
Client Name: Client 1 } 420

| ID 602 | Description 604 | ... | Status 606 | Group 608 | Subsystem 610 | Process(es) 612 | ... | Resource 614 |
|---|---|---|---|---|---|---|---|---|
| 61 | Req 6/10 | ... | Available | Group 1 | Subsystem 3 | Maintenance | ... | 5000 |
| 62 | Req 6/12 | ... | Available | Group 1 | Subsystem 3 | | ... | 25000 |
| 63 | Req 6/12 | ... | Available | Group 1 | | | ... | 15000 |
| 64 | Req 613 | ... | Available | | | | ... | 1000 |

Update Table 1400

| ID | Subsystem Name | ... | Status | Group | Subsystem | Process(es) | ... | Resource Allocated |
|---|---|---|---|---|---|---|---|---|
| 61 | Subsystem 1 | ... | Available | Group 1 | Subsystem 3 | Maintenance | ... | -100 |
| 72 | Subsystem 1 | ... | Available | Group 1 | | | ... | -250 |
| 53 | Subsystem 1 | ... | Available | Group 1 | | | ... | -1500 |
| -- | Subsystem 1 | ... | Available | Group 1 | Subsystem 3 | Maintenance | ... | 1850 |

PRE-ALLOCATING RESOURCES WITH HIERARCHY-BASED CONSTRAINTS

BACKGROUND

Resource allocation is a process for receiving, pooling, and assigning resources to processes such that those processes can be executed. Efficiently distributing resources can ensure that processes can be carried out with minimum latency. Scheduling process execution may take into consideration both the resource availability and the source of the resources. Resource allocation may be decided using computer algorithms applied to a specific domain to automatically and dynamically distribute resources to various processes. For example, CPU time slice allocation may use an auction algorithm or a proportional share scheduling algorithm. Other examples allow processes to "bid" for the best source of resources using auction theory. Resource allocation is especially common with regard to electronic devices dedicated to communication and routing. For example, channel allocation and wireless communication may be decided by a base transceiver station using a specialized algorithm. However, although resource allocation algorithms can be applied to many different systems, applying source-defined constraints on resource allocation has not been implemented in an efficient and algorithmic manner.

BRIEF SUMMARY

In a resource-pooling system, predictions can be made as to when and how resources may be needed by particular processes in the system. Requests can be made preemptively to client systems to pre-allocate resources such that resources are ready to use when needed. Client systems can submit constraints on how particular resources may be used by the system. In order to efficiently evaluate these constraints, the system may be organized into a hierarchy of groups, subsystems, and processes, and the constraints may be formulated to match this hierarchy. When resources need to be allocated, constraints may be evaluated using an algorithm that traverses levels of the hierarchy to quickly identify pre-allocations that are available for a particular process based on its location in the system hierarchy.

When processes can be scheduled or anticipated, the system may request resources from a plurality of different client systems. This ensures that sufficient resources are available when the process executes. These client systems may provide resources according to predefined percentages that balance the resource allocation from the different sources. These resources can be pre-allocated into a general pool that is managed by the system itself. However, when submitting resources to be pre-allocated, the source client systems may articulate constraints on how each particular pre-allocation of resources may be used by the system.

In order to efficiently evaluate source-defined constraints, the system may be organized into a parent-child hierarchy. The system may serve as a root node, and each subsystem in the system may be organized as descendant nodes in the data structure. The hierarchical data structure may be organized into groups that include subsystems and one or more of the subsystems related as child nodes. Specific processes to be executed may be assigned to each individual subsystem in the tree.

This source-defined constraints may then be defined based on the structure of the hierarchy of subsystems. For example, each pre-allocation event may populate an entry in a resource table. Fields in the resource table for each pre-allocation may correspond to levels of the hierarchy, such as processes, subsystems, groups, and the system as a whole. This allows source systems to define constraints at any level of generality.

When a process requires an allocation of resources to execute, the system may perform an efficient incremental algorithm to quickly identify entries in the resource table that can be applied to the resource allocation for a specific process. Using a single scan through the table, the algorithm can identify entries that either fulfill constraints or fail the constraints with a minimal number of comparison operations. Resources can then be allocated to the process immediately, and log/update tables may be automatically generated to update the resource table and ensure that resources are requested from source client systems in a load-balanced manner.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 8 illustrates additional pre-allocations made to the resource table, according to some embodiments.

FIG. 14 illustrates an update table that may be used to update the resource table, according to some embodiments.

DETAILED DESCRIPTION

Figure 1:
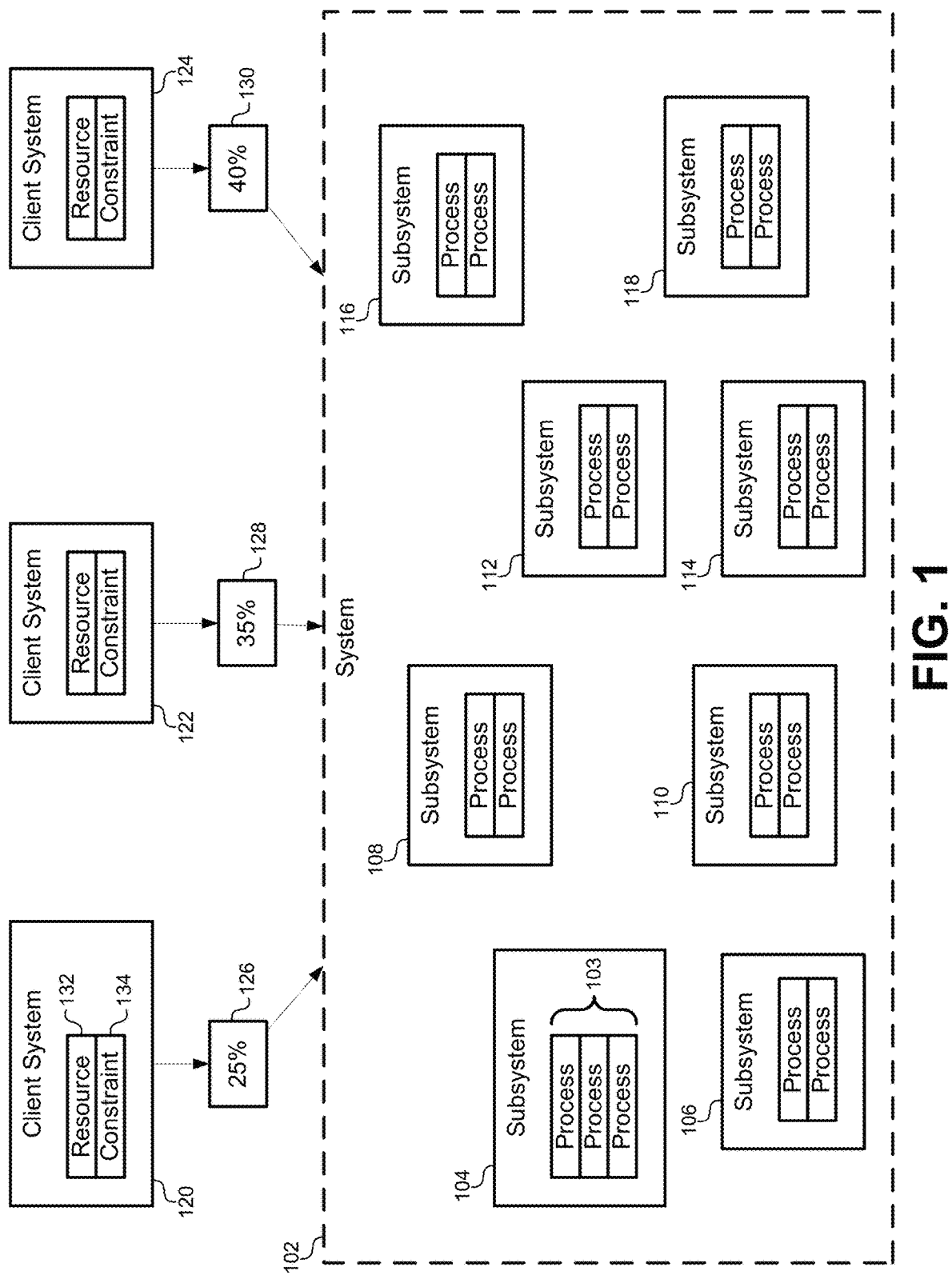
FIG. 1 illustrates a system comprising a plurality of subsystems, according to some embodiments.

FIG. 1 illustrates a system 102 comprising a plurality of subsystems 104, 106, 108, 110, 112, 114, 116, 118, according to some embodiments. Each of the subsystems may be assigned one or more processes. For example, subsystem 104 is assigned three processes 103. Generally, each of the processes may be designed to use an allocation of a particular type of resource. Note that the system 102 is not initially defined as a hierarchy. Although relationships may exist between one or more of the subsystems 104, 106, 108, 110, 112, 114, 116, 118, the main organization of the subsystems is in relation to the system 102 itself.

As used herein, the "system" 102 may include any type of system, process, project, or other organization of information. Each of the plurality of subsystems 104, 106, 108, 110, 112, 114, 116, 118 may include any type of system that falls under the umbrella of the system such that the subsystem is a part of the system 102. Processes may be identified by a numerical identifier or address may represent specific activities that are executed for each of the subsystems. The pre-allocation of resources described herein may handle any type of resource. The emphasis of this disclosure is on the technique by which resources may be pre-allocated with constraints, and how those constraints can be evaluated against a hierarchy when an allocation of resources is required by a process. Thus, the resources described herein may include any type of resource. For example, some embodiments may use computing resources such as bandwidth, processor time, memory or storage capacity, and so forth. These resources may be contributed in a joint processing operation or peer to peer network, and these resources may be applied to a particular process such that that process can be executed. However, the system, subsystems, and resources need not be limited to these specific types of computing resources.

The system 102 or a system administrator may know or predict when resources need to be allocated to a particular process. In order to avoid situations where resources are due to be allocated to processes and the resources are not immediately available to the system 102, the system 102 may be configured to pre-allocate resources in advance of when they are required by the processes. For example, the system 102 or a system administrator may know when a process is scheduled to require resources, and may pre-allocate the required type of resources in advance such that they are ready and available to be allocated to the process when required.

When pre-allocating resources, the system may make a request for resources from one or more client systems 120, 122, 124. The client systems 120, 122, 124 may include external systems that have agreed to provide resources for the system 102 to operate. In some embodiments, a request may be sent to the plurality of client systems 126, 128, 130 to pre-allocate a total amount of a particular resource type to the system 102. The total amount may be scaled for each of the client systems 120, 122, 124 based on a percentage amount 126, 128, 130, respectively, assigned to each of the client systems 120, 122, 124.

When providing the resource to be pre-allocated, the client systems 120, 122, 124 may impose constraints upon the use of those resources. The constraints may indicate a specific process, a specific subsystem, or a specific group of subsystems that are authorized to use the corresponding resource. For example, client system 120 may pre-allocate resource 132 that includes constraint 134. Constraint 134 may indicate that resource 132 may only be used with processes 103 of subsystem 104. Later, when another subsystem, such as subsystem 108 needs to be allocated that type of resource, the resource 132 would not be allocated to subsystem 108 based on the constraint 134.

Figure 2:
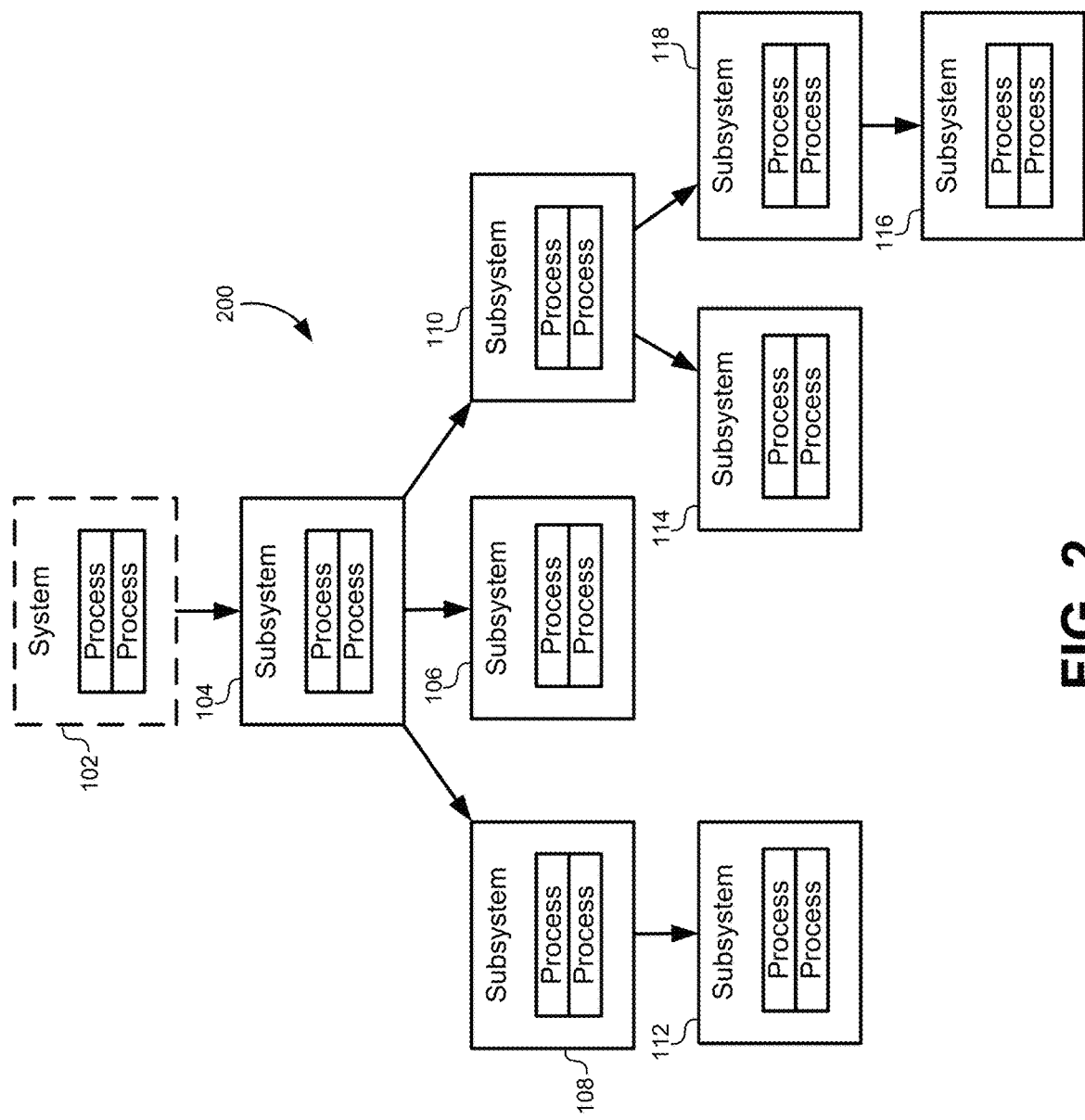
FIG. 2 illustrates how subsystems within the system may be organized into a hierarchy of subsystems, according to some embodiments.

FIG. 2 illustrates how subsystems within the system may be organized into a hierarchy of subsystems, according to some embodiments. In order to efficiently process constraints that may be placed on the allocation of resources, some embodiments may first organize the collection of subsystems into a hierarchy of subsystems that can be traversed from top-to-bottom and/or from bottom-to-top. To build the hierarchy of subsystems, the system 102 itself may be designated as a root node of a hierarchy of subsystems 200. The hierarchy of subsystems 200 may be created using any type of data structure, such as a linked list, an array, a database, and/or any other data structure that provides links from one node to another node. The root node representing the system 102 may include pointers to child nodes and a reference to another data structure representing the system 102. The data structure representing the system may include any text fields describing the system (e.g., name, owner, ID number, etc.). Alternatively, the node representing the system 102 may include text fields in the node that describe the system with requiring a link to external information.

The hierarchy of subsystems 200 may next include the plurality of subsystems 104, 106, 108, 110, 112, 114, 116, 118 that fall under the system 102. The plurality of subsystems may include relationships with each other that can be used to build the hierarchy of subsystems 200. For example, subsystem 110 may receive information from subsystem 114 and/or subsystem 118 or generate outputs for subsystem 118. This may be interpreted as a parent-child relationship for purposes of constructing the hierarchy of subsystems 200. In another example, subsystem 116 may be a part of subsystem 118. This may also be interpreted as a parent-child relationship. Each of the relationships between the subsystems may be identified and translated into parent-child relationships, and a hierarchical data structure may be constructed based on these parent-child relationships.

As illustrated in FIG. 2, each of the nodes in the data structure of the hierarchy of subsystems 200 may depend from the top-level system 102. Nodes may be created for each of the plurality of subsystems and linked together using the identified parent-child relationships. The links between nodes may allow the hierarchy of subsystems 200 to be traversed in either direction. For example, referencing subsystem 110, child links may be traversed to identify subsystem 114 and subsystem 118. Additionally, a parent link may be traversed to identify subsystem 104. As described below, the algorithms for applying constraints to resource allocations may traverse the hierarchy 200 in either direction.

Figure 3:
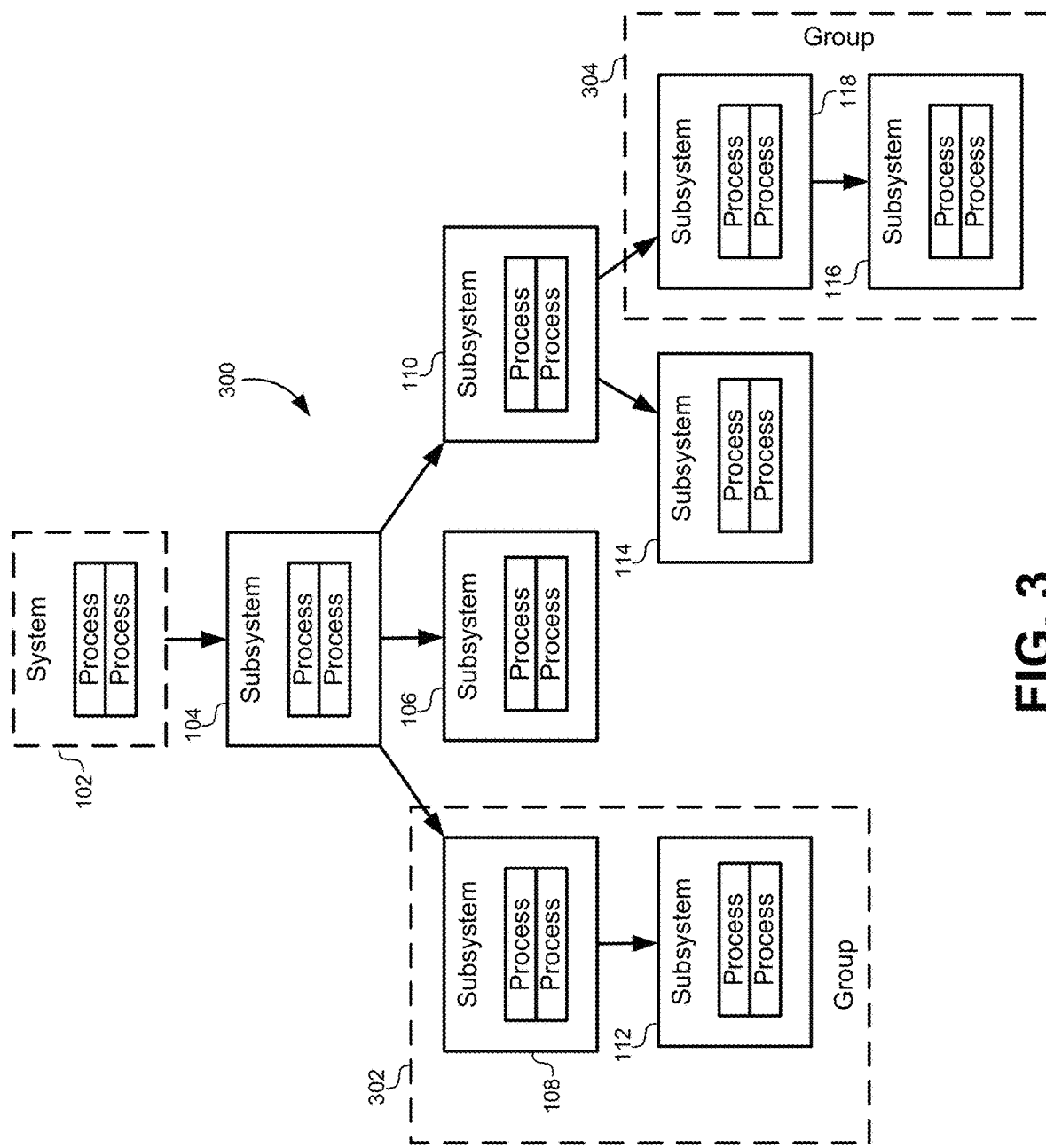
FIG. 3 illustrates an additional operation that may be performed as part of organizing the plurality of subsystems into a hierarchy of subsystems, according to some embodiments.

FIG. 3 illustrates an additional operation that may be performed as part of organizing the plurality of subsystems into a hierarchy of subsystems, according to some embodiments. Some of the plurality of subsystems 104, 106, 108, 110, 112, 114, 116, 118 may be linked together by more than simple parent-child relationships. These subsystems may be organized together in a hierarchy of subsystems 300 to form individual groups that can receive special consideration when evaluating constraints against resource allocations. In FIG. 3, subsystem 108 and subsystem 112 may be grouped together in a group 302 to be considered together. The group 302 may be referenced by the highest subsystem in the hierarchy, which in this case is subsystem 108. Another group 304 may be formed from subsystem 118 and subsystem 116. Groupings of subsystems may indicate subsystems that are together related to a specific project.

As described in greater detail below, groups may be considered together when evaluating constraints on resource allocations. Instead of allocating resource to a specific subsystem or to a specific process within a subsystem, a resource may be provided to the system 102 with constraint limiting its use to a particular group. For example, a resource may be pre-allocated with a constraint identifying group 302. Any of the subsystems, including subsystem 108 and subsystem 112 in group 302 would then be allowed to later allocate the resource and fulfill this constraint.

Groups may be formed using a number of different methods. In some embodiments, groups may be automatically formed simply by virtue of parent-child relationships. For example, group 302 may be automatically formed by identifying that subsystem 108 has one or more child subsystems. The group 302 may be automatically formed to include subsystem 108 and each of the descendants (child, grandchild, etc.) of subsystem 108, which in this case includes subsystem 112 and any children of subsystem 112 (not shown). In other embodiments, groups may be formed by virtue of subsystems sharing a similar attribute. Thus, groups need not be automatically formed based on parent-child relationships, but instead would be formed based on similar attributes. For example, a group need not necessarily be formed to include subsystem 110 and each of its descendant subsystems. Instead, a similar attribute may be identified for subsystem 116 and subsystem 118 (e.g., belonging to a similar project), and a group 304 may be formed to include subsystem 116 and subsystem 118. Alternatively, referring to a subsystem alone may imply a group of subsystems comprising each of the descendant subsystems of the subsystem. For example, referring to subsystem 108 may be equivalent to referring to group 302 in some embodiments.

A group may be identified with a distinct group identifier or by virtue of a top-most subsystem in the group. For example, group 302 may be identified by subsystem 108. In this case, any constraint identifying a group of subsystem 108 would be fulfilled by any of the members of group 302, which would include all of the children of subsystem 108.

Figure 4:
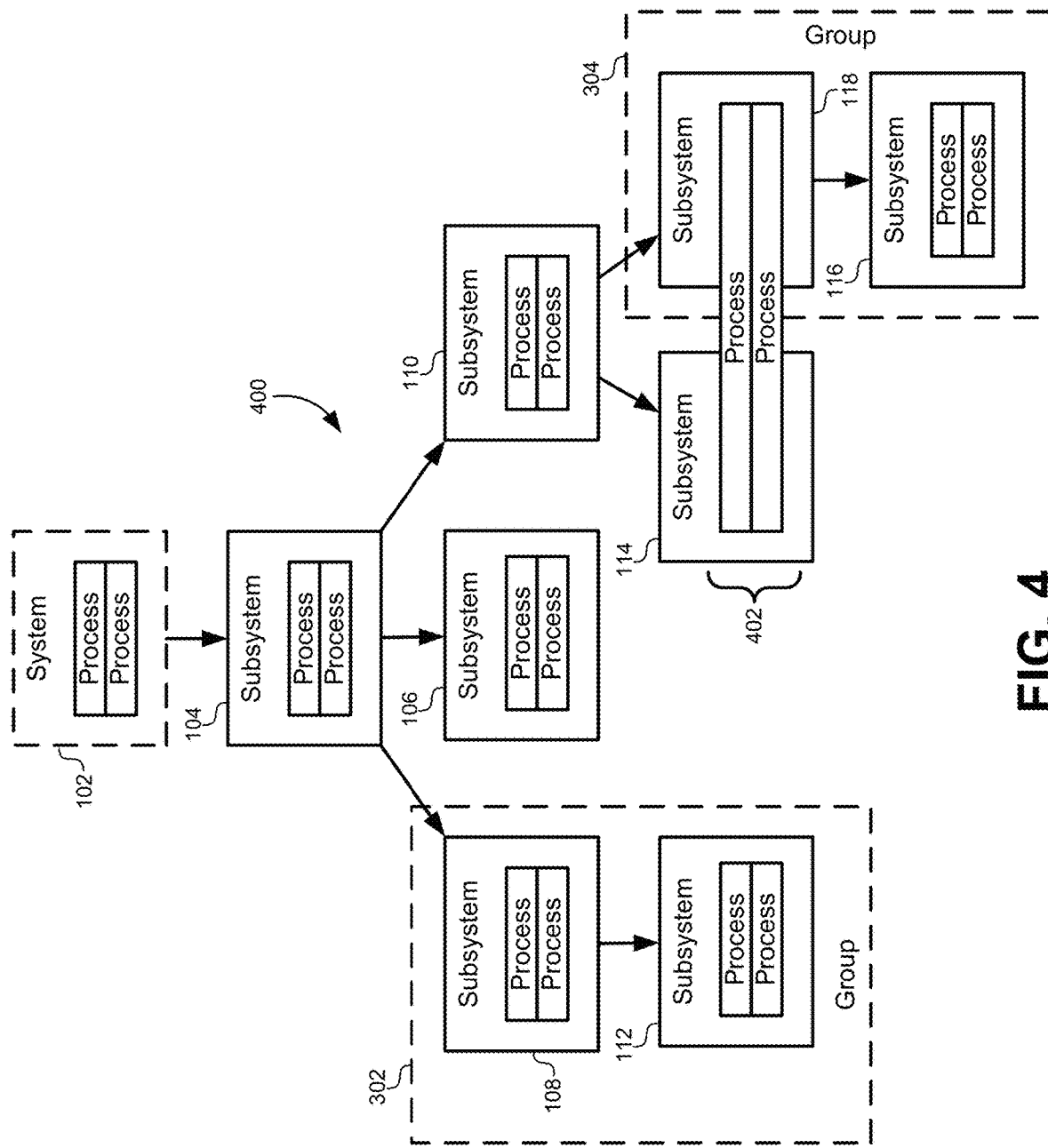
FIG. 4 illustrates how processes may be used in various subsystems, according to some embodiments.

FIG. 4 illustrates how processes may be used in various subsystems, according to some embodiments. Generally, processes may be assigned to a specific subsystem. Each process in a subsystem may be identified with a unique identifier. Thus, a maintenance process in subsystem 108 may have a different identifier from an identical maintenance process in subsystem 112. Alternatively or additionally, some processes may be shared amongst subsystems 114. For example, processes 402 may be shared between subsystem 114 and subsystem 118. This may indicate maintenance being performed by a shared process between the two subsystems 114, 118 such that resources may be allocated to the processes 402 to cover both subsystems.

Figure 5:
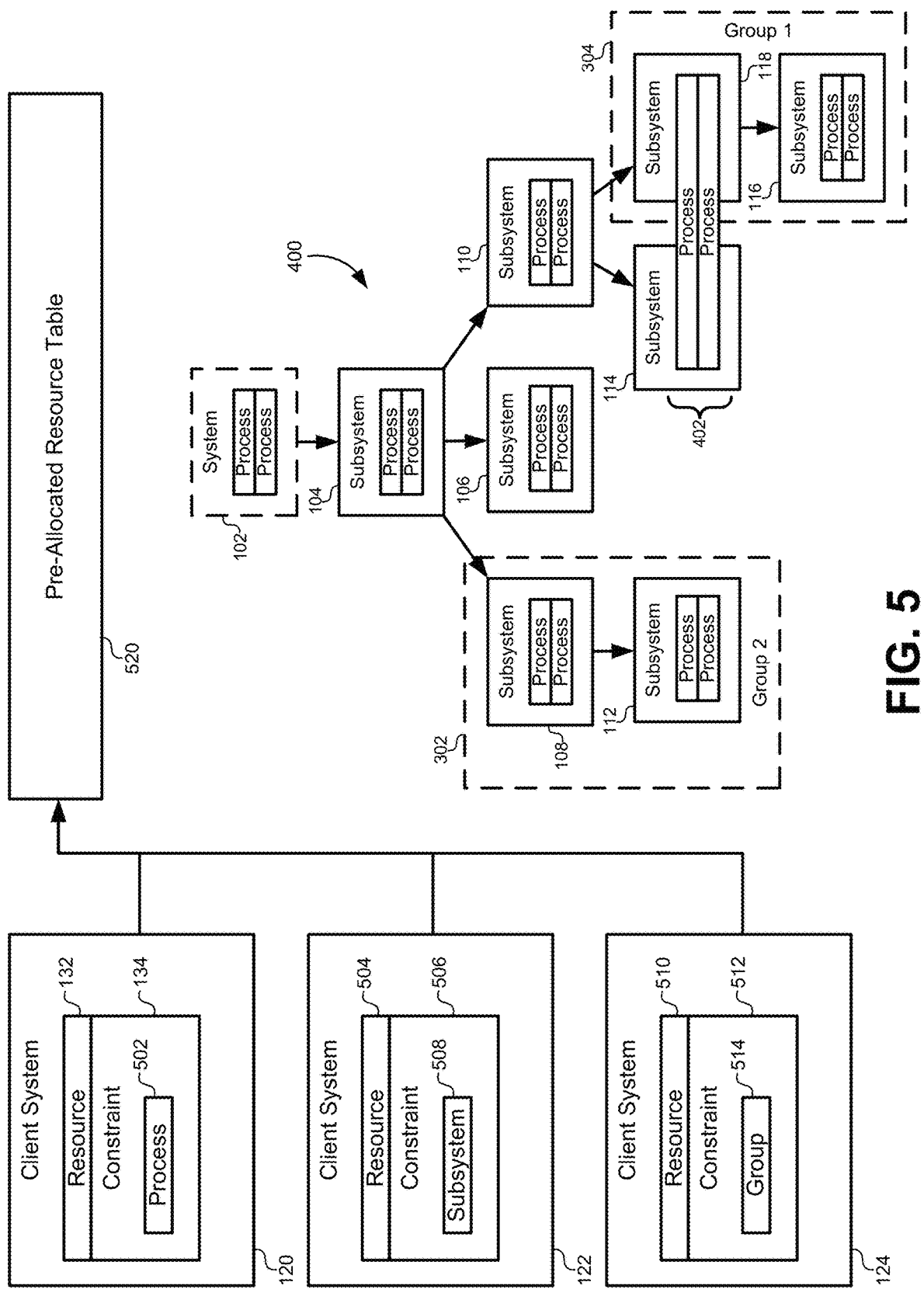
FIG. 5 illustrates a block diagram of how resources can be pre-allocated from client systems with constraints, according to some embodiments.

FIG. 5 illustrates a block diagram of how resources can be pre-allocated from client systems with constraints, according to some embodiments. Many times, the system 102, a system administrator, a project manager, etc., may be able to anticipate or predict when a resource will need to be allocated to a particular process or group of processes. When an allocation of resources can be predicted, the system 102, system administrator, or project manager may issue a "call" or request for resources to be pre-allocated from one or more client systems 120, 122, 124. In response, the client systems 120, 122, 124 may transfer control of the requested resources over to the system 102. Then, when the processes require allocation of the resources, the system can distribute the resources efficiently.

The client systems 120, 122, 124 may agree to provide resources 132, 504, 510, respectively, with constraints attached that govern which processes, subsystems, and/or groups may be allowed to use the resources. Generally, a constraint may indicate a portion of the hierarchy of subsystems that can use the resource. Only when a constraint is fulfilled by a particular process, subsystem, and/or group will the corresponding resource be allocated thereto. Instead of verbal or business agreements between the client systems 120, 122, 124 and the system 102 as to how resources should be used, the embodiments described herein implement an efficient algorithmic method to ensure constraints are met when processed against the hierarchy of subsystems 400.

By way of example, client system 120 may respond to a request for resources to be pre-allocated by providing a resource 132 to the system 102. This pre-allocation may include transferring ownership or responsibility for the resource over to the system 102. Along with the resource 132, the client system 120 may provide a corresponding constraint 134. The constraint may indicate a portion of the hierarchy of subsystems 400 to which the resource 132 may be allocated. In this example, the constraint 134 identifies a specific process 502. The process 502 may be identified by virtue of an identification number, which may be matched to an identification number of a corresponding process in the hierarchy of subsystems 400. Alternatively, the constraint 134 may identify the process 502 using text descriptions (e.g., "maintenance"). The system 102 may map the text description of the constraint to a corresponding text description of a process in the hierarchy of subsystems 400. For example, the "maintenance" text description in the constraint 134 may be mapped to a process having a numerical identifier of 4413224 with a corresponding text description of "maintenance and upkeep." This constraint 134 allows the resource 132 to only be applied to processes with a matching numerical identifier.

In another example, client system 122 may submit a resource 504 with a corresponding constraint 506 that identifies a specific subsystem 508 to which the resource 504 may be allocated. For example, the subsystem 508 may identify subsystem 106 in the hierarchy of subsystems 400, by virtue of a text description, numerical identifier, or other identifying field. This constraint 506 may allow any of the processes that are part of subsystem 106 to be allocated the resource 504.

In another example, client system 124 may pre-allocate a resource 510 to the system 102 with a corresponding constraint 512 that identifies a specific group 514 within the system 102 to which the resource 510 may later be allocated. The group 514 may refer to group 302 in the hierarchy of subsystems 400. Reference may be made to a specific group identifier (e.g., Group 2), or reference may be made to the top-most subsystem (e.g., Subsystem 108) in the group 302.

This constraint 512 allows subsystem 108 and any of the children of subsystem 108 that are part of group 302 to be allocated the resource 510.

Depending on the type of resource, resources may be pooled together at the pre-allocation stage and saved for later when they are later needed by various processes. In order to maintain and enforce the constraints when resources are later allocated, entries may be made in a pre-allocated resource table 520. This resource table 520 may store sources of resources, resource amounts, and corresponding constraints such that the constraints can be accurately enforced when resources are later allocated from the pool of resources.

Figure 6:
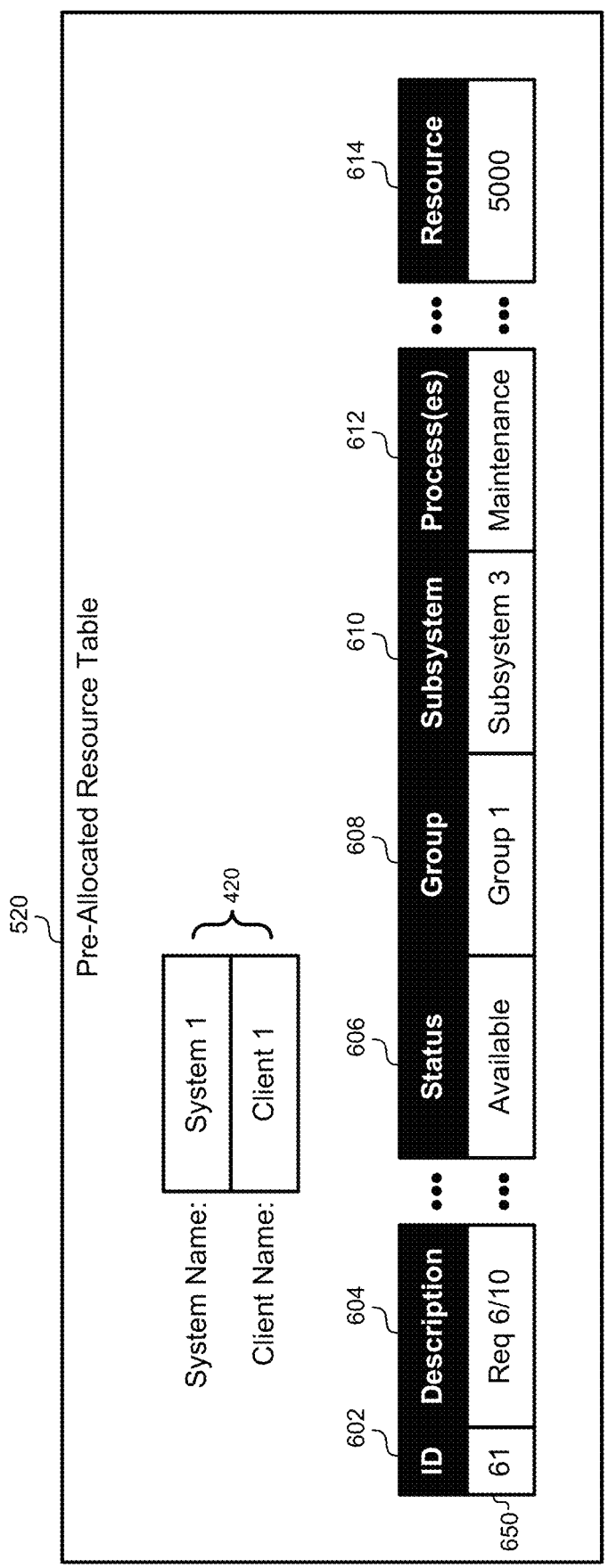
FIG. 6 illustrates an example of a pre-allocated resource table, according to some embodiments.

FIG. 6 illustrates an example of a pre-allocated resource table 520, according to some embodiments. The resource table 520 may act as a ledger to store a record reflecting a current amount of a resource type that has been pre-allocated to the system. When a new pre-allocation of resources is received from one of the client systems, the resource table 520 may be updated to add resources as a new entry in the resource table 520. Conversely, when resources are allocated to a process, amounts may be subtracted from the total resources for one or more entries in the resource table 520.

In addition to storing a resource amount 614, the resource table 520 may store a number of additional fields for each pre-allocation resulting from a "call" to a particular client system. The resource table 520 may include a field for a description 604 of the particular request that resulted in the pre-allocation of resources defined by this row 650 in the resource table 520. The description may include any text value, and may describe a request sent at a particular time to a plurality of different client systems. In this example, the description 604 may include a request type and time at which it was made.

Each row 650 of the resource table 520 may include a unique identifier 602 that identifies the specific pre-allocation instance. In some embodiments, each pre-allocation event may result in a new row being added to the resource table 520. This may be true even if the details of the pre-allocation event are identical. For example, two different pre-allocation events from the same client system resulting in the addition of the same amount of resources may result in two different rows being added to the resource table 520, each having a different unique identifier 602. A status field 606 may also indicate the availability of a resource for allocation.

As described above, the hierarchy of subsystems may be leveraged to efficiently identify and evaluate constraints. The fields in the table 520 defining the constraint can be populated from left-to-right to reflect the hierarchy of subsystems in a top-down manner. In this example, a first level that may be defined is a group 608. This field may designate a particular group within the hierarchy of subsystems. The group may be identified by a group name or a top-most subsystem name. The next level that may be defined in the hierarchy is a subsystem 610. By naming a specific subsystem 610, the resource may be allocated to any process assigned to that subsystem 610. A final level that may be defined in the hierarchy is a specific process 612.

In some cases, the client system may specify a constraint by defining only the right-most field to be populated, and the resource table 520 may fill in any remaining information to the left of the right-most field. For example, if the client system submits a constraint indicating the maintenance process 612, the resource table may automatically identify a subsystem and/or group that includes the maintenance process 612 and populate those fields. In other embodiments, the fields to the left of the right-most field may be left empty or undefined. Any value in fields are not specifically populated by constraint may be referred to as "null" fields, which may include default values, placeholder values, zero values, undefined values, random values not corresponding to a subsystem or group, and/or the like. In the example of FIG. 6, the resources identified by row 650 include a constraint that is defined at the process level. The corresponding group 608 and subsystem 610 have been populated to the left of the process constraint 612.

Some embodiments may allow more than one process to be identified. For example, instead of identifying a single process ID, a constraint may define a group of processes. The group of processes may include a range of processes defined by a start ID and an end ID. The group of processes may also exclude specific processes from inside the range of processes. For example, a group of processes may be defined as processes with IDs ranging from 44657 to 44692, while excluding a process with an ID of 44663 and processes with IDs ranging from 44676 to 44681. This is particularly useful when subsystems include a large number of processes, and allows the client system to specifically define individual processes that should be included/excluded by the constraint.

Note that this example of a resource table 520 is greatly simplified to show only a single pre-allocation of resources from a single client system to a single system. Fields 520 may be used to filter the resource table 520 to provide the view in FIG. 6. Additional information in each row that has been omitted for clarity may include a system name, a client system name, and other identifying information. Thus, the resource table 520 may include resource allocations for many different systems and hierarchies of subsystems, along with pre-allocations of resources from many different client systems.

Figure 7:
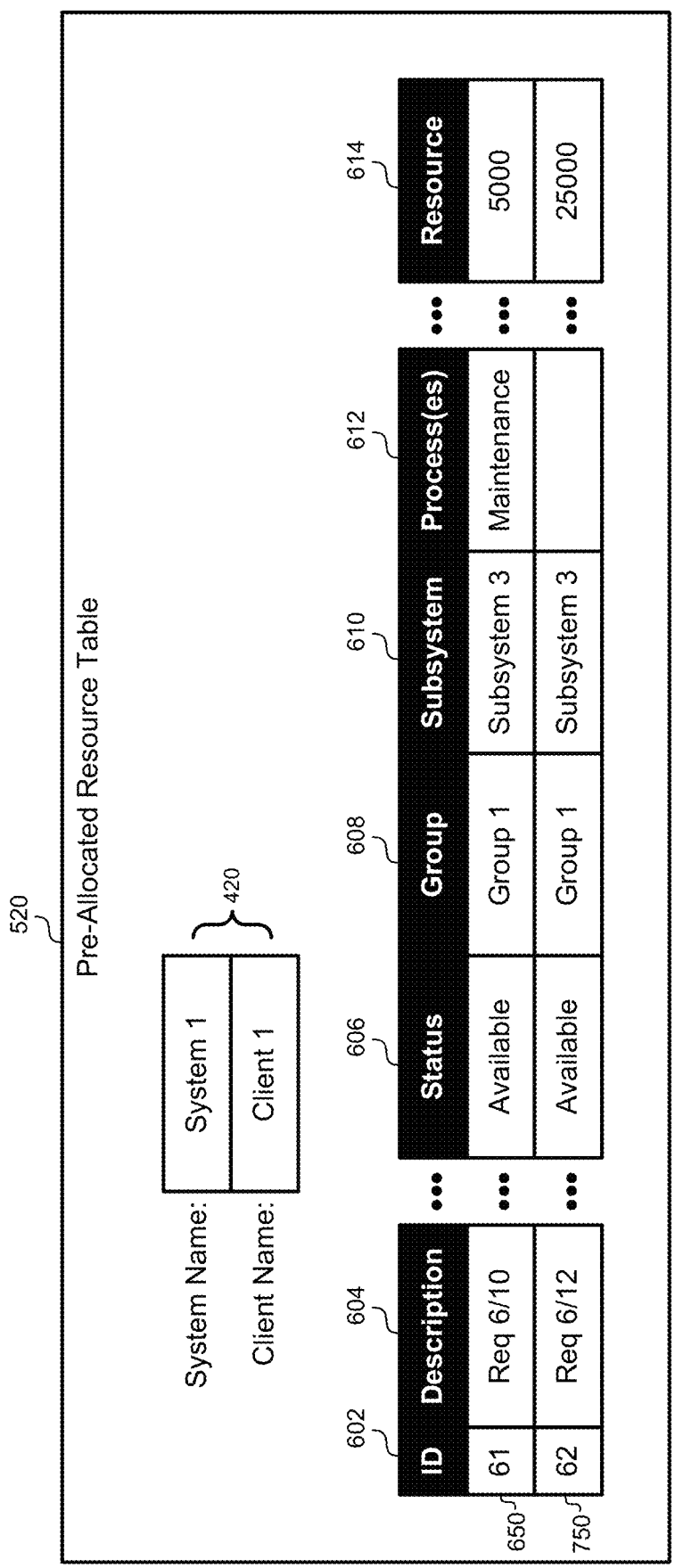
FIG. 7 illustrates how a subsequent pre-allocation of resources can be added to the resource table, according to some embodiments.

FIG. 7 illustrates how a subsequent pre-allocation of resources can be added to the resource table 520, according to some embodiments. As described above when a subsequent amount of resources is pre-allocated, a new row may be added to the resource table 520. The new row 750 may be assigned a new unique identifier 602, and the description 604 may be specific to the request or the client system submitting the pre-allocation of resources. The remaining fields may be populated based on the amount of resources received from the client system and the details of the particular constraint associated with this pre-allocation.

In this example, the constraint is defined at the subsystem level. Therefore, the process field 612 is left undefined (or null) in the resource table 520. Instead, the right-most populated field identifies the subsystem 610 that defines the constraint. In this example, the corresponding group 608 may also be populated if the identified subsystem (e.g. subsystem 3) is determined to belong to a particular group (e.g., group 1) in the hierarchy of subsystems. Therefore, the null value in a column may represent a "wildcard" value that can apply to any process. Note that FIG. 7 is provided only by way of example and is not meant to be limiting. Other embodiments may place a wildcard or other value in the process field 612 and/or the group field 608.

FIG. 8 illustrates additional pre-allocations made to the resource table 520, according to some embodiments. In this example, two additional pre-allocations from the same client system have resulted in two new entries 150, 852 in the resource table 520. The first new entry 850 illustrates a constraint that is defined at the group level. Specifically, the group field 608 identifies a specific group or project to which the corresponding resource may be allocated. Any subsystem or process that is part of the group identified in the group field 608 may fulfill the constraint and receive the allocated resources.

The second new entry 852 may define a constraint at the system level. Although omitted for clarity, one of the additional fields in each of the entries in the resource table 520 may define a specific system to which the resource pre-allocation is assigned. Consequently, none of the remaining fields in the constraint sequence 608, 610, 612 need to be populated. This indicates that any process assigned to a subsystem in the system may use the allocated resources.

Figure 9:
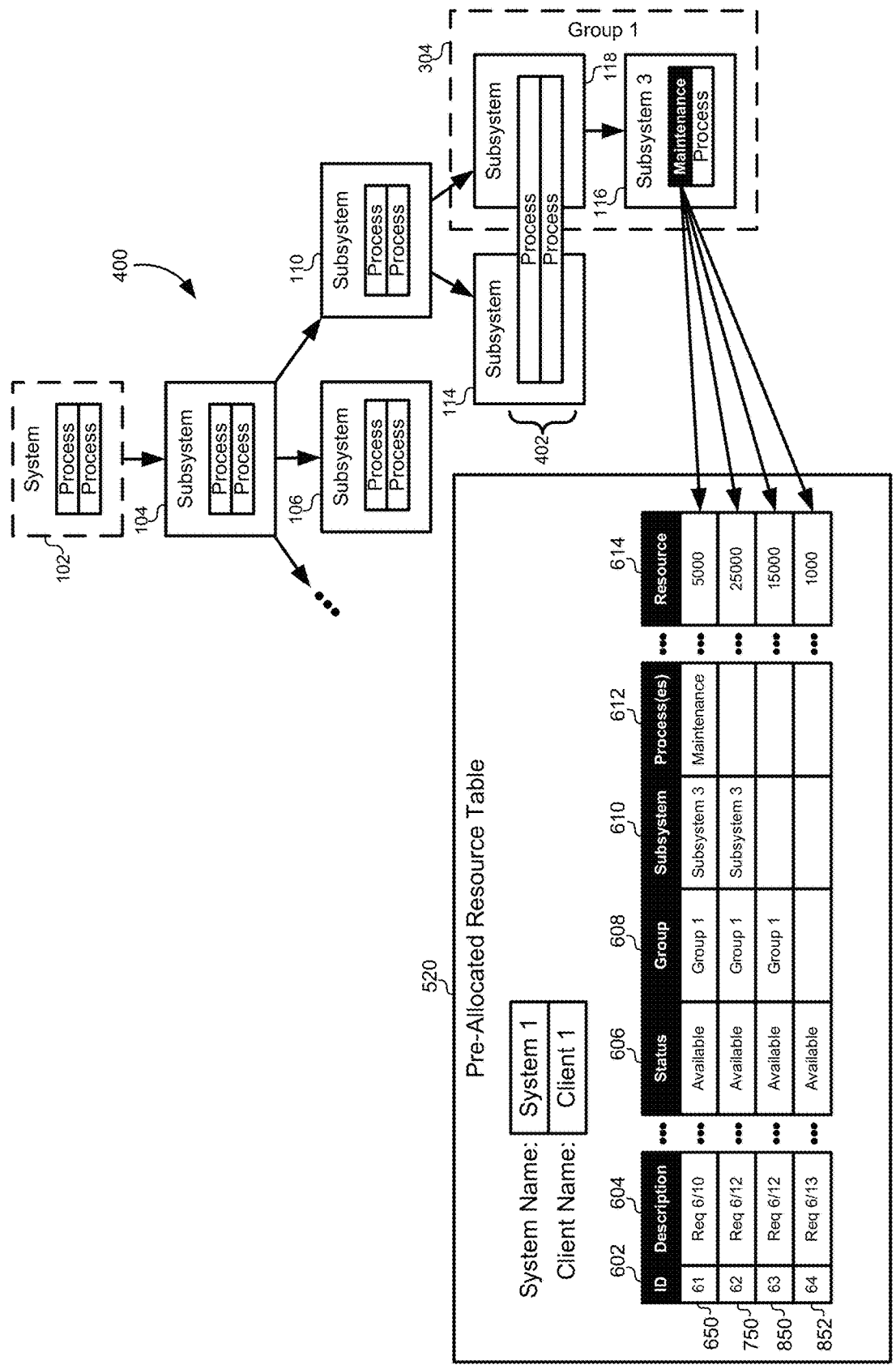
FIG. 9 illustrates how an algorithm may be executed to allocate pre-allocated resources to a specific process, according to some embodiments.

FIG. 9 illustrates how an algorithm may be executed to allocate pre-allocated resources to a specific process, according to some embodiments. At this stage, the pre-allocation of resources described above has been completed. Resources have been allocated to the system as a whole, and constraints have been entered in the resource table 520 described above. The system now continues to operate until a process requires allocation of the pre-allocated resources. Because these resources were predictably pre-allocated, no request for additional resources is needed at this time. Thus, receiving a request for a particular resource from a process assigned to a subsystem in the hierarchy of subsystems 400 may result in performing the following operations.

When a request to allocate resources to a particular process is received, the request may be accompanied by an identifier for the particular process. The algorithm for allocating resources may begin by filtering the resource table 520 for the particular system to which the process belongs. Note that in some embodiments, each system may be associated with its own dedicated resource table 520, in which case no filtering at this stage may be necessary. Next, each column from right-to-left in the resource table 520 may be evaluated to correspond to various levels of the hierarchy of subsystems 400.

In this example, a maintenance process in subsystem 116 may request the allocation of resources. To efficiently identify pre-allocations of resources that may be allocated to the process, the algorithm may begin by examining the process entries 612 in the resource table 520. Any pre-allocation entries specifically identify the maintenance process may pass this level of the constraint. Any pre-allocation entries that specify a different process from the maintenance process may be eliminated. A null value in the process field 612 may indicate that additional constraint evaluations for that entry may be needed. In some embodiments, if the process field 612 identifies the requesting process specifically, that entry may be immediately determined to fulfill the constraints of the pre-allocation. In this example, pre-allocation entry 650 in the resource table 520 specifically identifies the maintenance process in the process field 612. Therefore, an amount of resources 614 may be allocated to the maintenance process without further evaluation of that pre-allocation entry 650.

The remaining entries 750, 850, 852 illustrated in FIG. 9 may require further evaluation by virtue of the null value stored in the process field 612. Next, the subsystem field 610 may be compared to a subsystem to which the requesting process is assigned. In this example, "subsystem 3" is identified in the subsystem field 610 for entry 750 in the resource table 520. As described above for the process field 612, entries with a subsystem field 610 that specifically identifies the corresponding subsystem in the hierarchy of subsystems 400 may be determined at this stage to fulfill the constraint without further evaluation. Thus, entry 750 may also indicate that the corresponding resource amount 614 for entry 750 may be allocated to the maintenance process.

Entry 850 and entry 852 have not yet been eliminated at this stage because they have null values assigned to the subsystem field 610. If either of these entries 850, 852 specifically identified another subsystem in the subsystem field 610, they could be eliminated as not fulfilling the constraint.

Next, a group may be determined for the requesting process (e.g., the maintenance process). In this example, the requesting process belongs to group 304 referred to as "group 1." This group may then be compared to the group field 608 in the resource table 520. As with the previous fields described above, if the group field 608 matches the group 304 of the requesting process, the constraint may be fulfilled and the resources may be allocated. Note that entry 852 does not include a value for the group field 608, and thus may be applied to any process in the hierarchy of subsystems 400.

Each non-null value in in a column of the resource table 520 may be used to either qualify or disqualify an entry from providing resources to the requesting process. If the entry in the column matches an attribute of the process (e.g., process, subsystem, group, etc.), then the resource may be allocated to the process. Conversely, if the entry in the colon does not match the attribute of the process, then the entry can be disqualified as being incompatible with allocating resources to the process. Thus, any value in the column can terminate processing for that specific entry in the resource table 520 such that that entry does not need to be reprocessed when considering columns further to the left. Columns with null values may continue processing in these more leftward columns.

Figure 10:
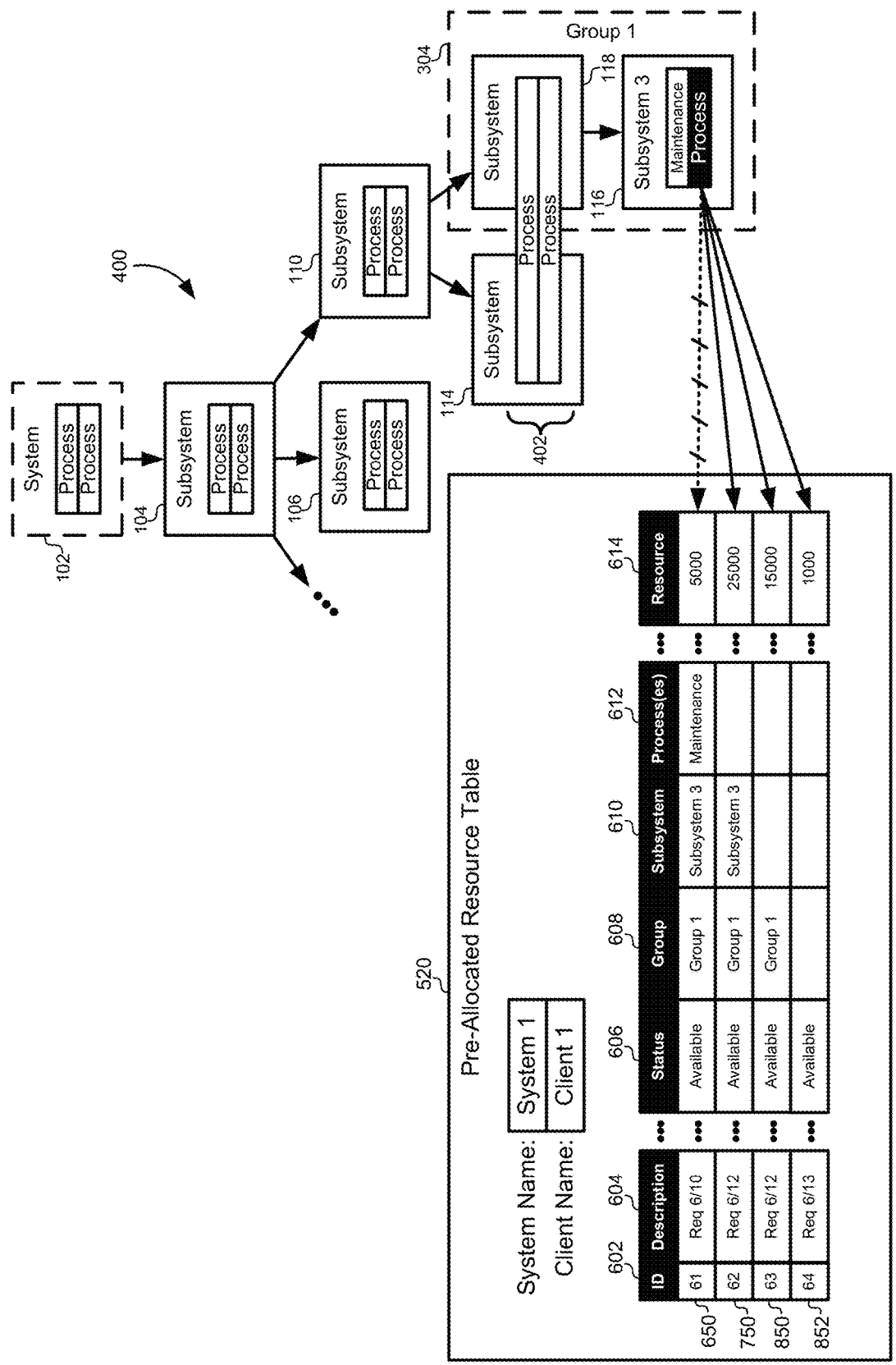
FIG. 10 illustrates how constraints can disqualify pre-allocations of resources at the process level, according to some embodiments.

FIG. 10 illustrates how constraints can disqualify pre-allocations of resources at the process level, according to some embodiments. In this example, a process in subsystem 116, group 304 requires the allocation of resources. The evaluation of entries 750, 850, and 852 may proceed as described above, as the requesting process still fulfills each of these constraints. However, the evaluation of entry 650 may change. At the first stage of the algorithm when the process field 612 is evaluated, it may be determined that the "maintenance" process specified in the process field 612 for entry 650 disqualifies entry 650 from being allocated to the requesting process. Therefore, the algorithm may efficiently eliminate entry 650 when evaluating the remaining constraint entries 610, 608 in the resource table 520.

Figure 11:
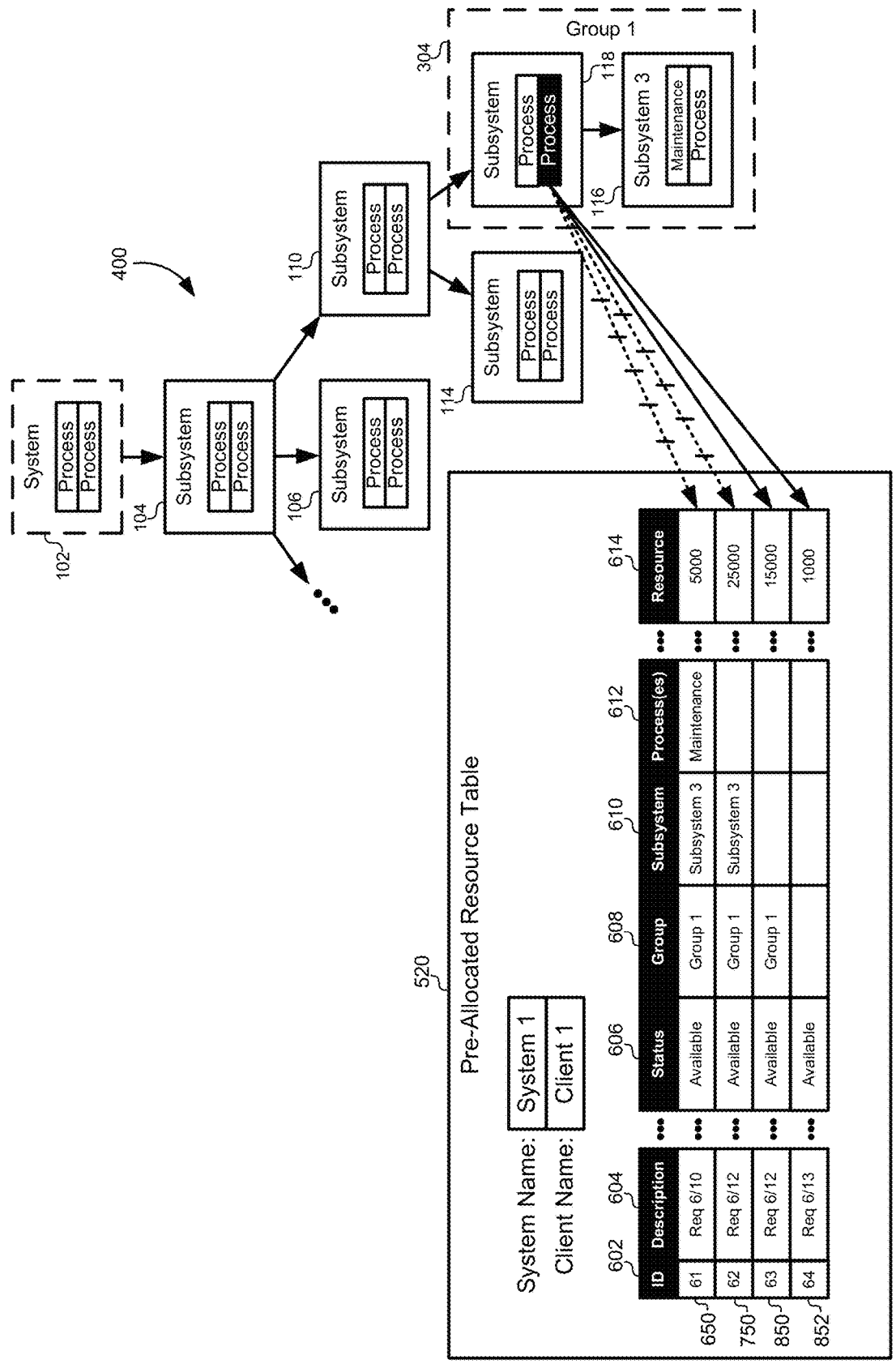
FIG. 11 illustrates how constraints can disqualify pre-allocations at the subsystem level, according to some embodiments.

FIG. 11 illustrates how constraints can disqualify pre-allocations at the subsystem level, according to some embodiments. In this example, a process in subsystem 118, group 304 requires the allocation of resources. The evaluation of entries 650, 850, and 852 may proceed as described above, as the constraint fails for entry 650 and is fulfilled for entries 850 and 852. At the second stage of the algorithm when the subsystem field 610 is evaluated, it may be determined that the specific subsystem identified in entry 750 is different from subsystem 118 to which the requesting process is assigned. Thus, the constraint for entry 750 may fail, and entry 750 may also be disqualified from allocating resources to the requesting process along with entry 650.

Figure 12:
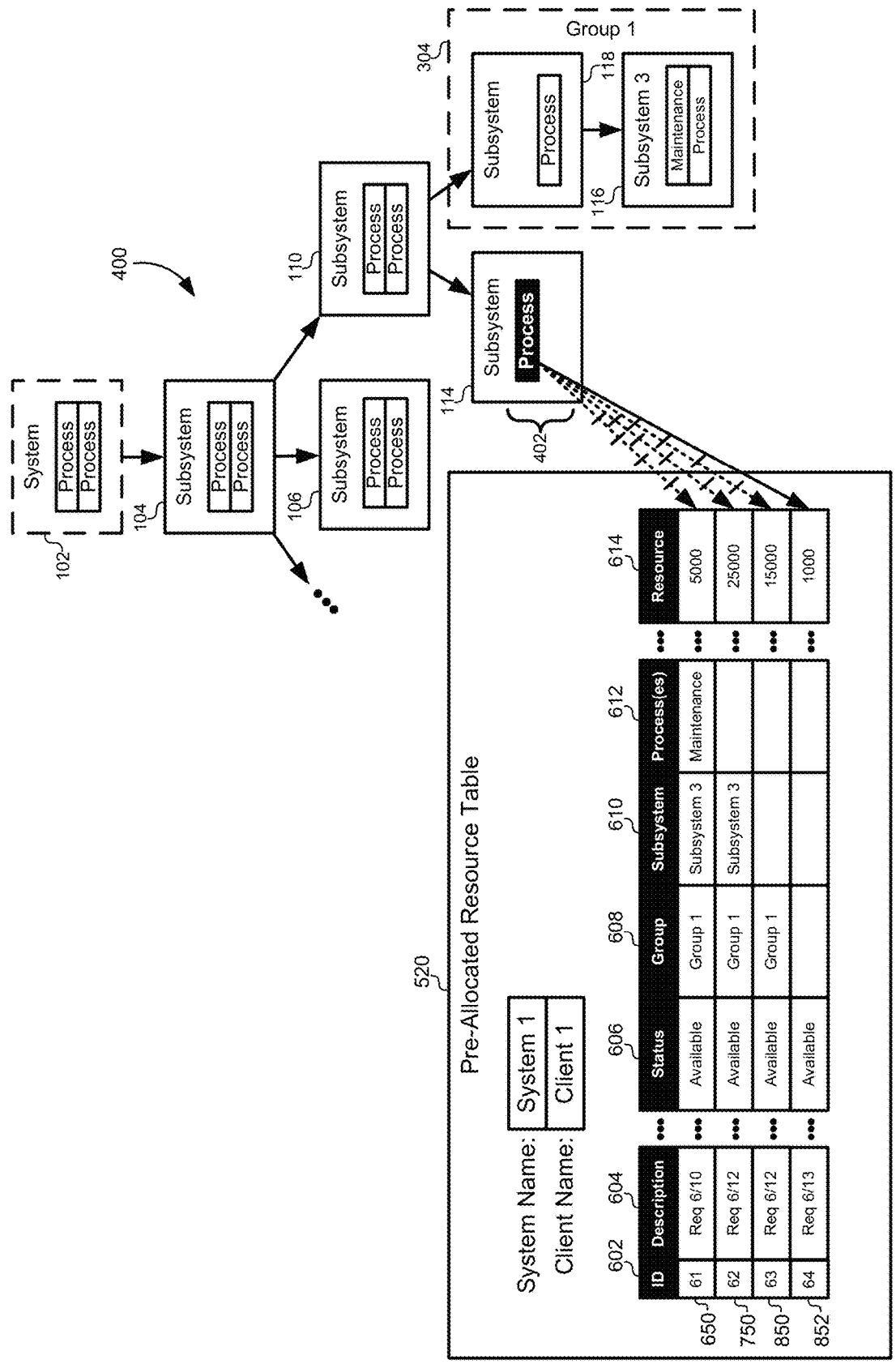
FIG. 12 illustrates how constraints can disqualify pre-allocations at the group level, according to some embodiments.

FIG. 12 illustrates how constraints can disqualify pre-allocations at the group level, according to some embodiments. In this example, a process in subsystem 114 requires the allocation of resources. The evaluation of entries 650, 750, and 852 may proceed as described above, as the constraint fails for entries 650 and 750 while being fulfilled for entry 852. At the third stage of the algorithm when the group field 608 is evaluated, it may be determined that the specific group identified in entry 850 is different from a group to which the requesting process is assigned. In this example, the requesting process in subsystem 114 is not assigned to a specific group. Thus, the constraint for entry 850 may fail and entry 850 may be disqualified from allocating resources to the requesting process.

Figure 13:
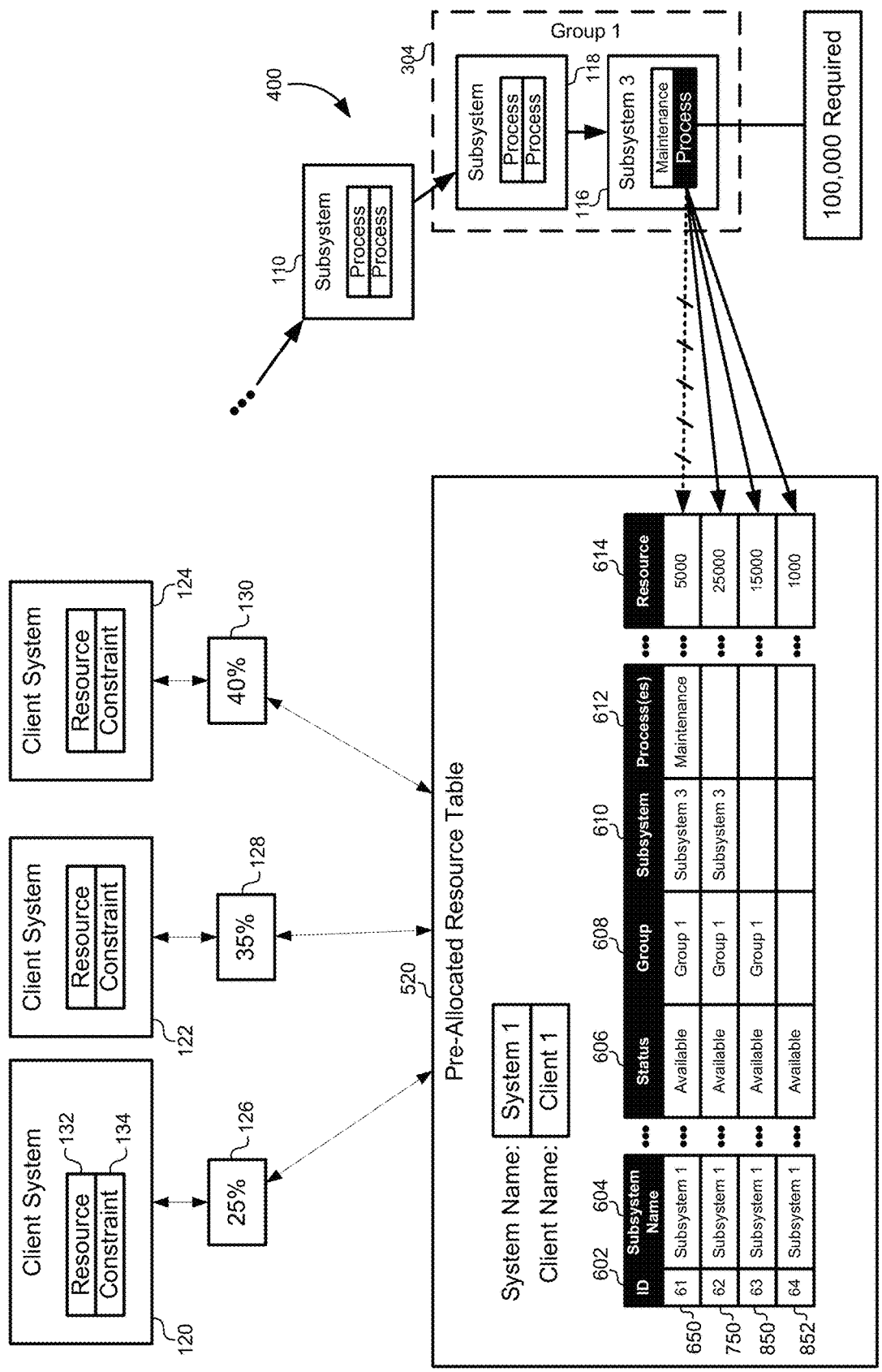
FIG. 13 illustrates how a resource deficit can be overcome when allocating resources, according to some embodiments.

FIG. 13 illustrates how a resource deficit can be overcome when allocating resources, according to some embodiments. Although the examples described above show resource allocations from only a single client system, most resource allocations may involve pulling resources from pre-allocations provided from a plurality of different client systems. As described above, each of these client systems may provide pre-allocated resources according to a predefined percentage 126, 128, 130 in order to fulfill the anticipated resource need by the system.

These percentages 126, 128, 130 may also be used when allocating resources from available pre-allocations. For example, if the requesting process in FIG. 13 requires a certain amount (e.g. 100,000) of resources then based on the percentages 126, 128, 130, the system would request a pre-allocation of 25,000 from client system 120, 35,000 from client system 122, and 40,000 from client system 124. When the actual allocation is made to the process, each client system may be considered individually, such that the resource table 520 attempts to allocate 25,000 resources from pre-allocations provided from client 120, 35,000 resources from pre-allocations provided from client 122, and 40,000 resources from pre-allocations provided from client 124. In some cases, the system may allow resources pre-allocated from one client system to fulfill a percentage-based requirement from another client system if the other client system has not pre-allocated a sufficient amount.

Considering a single client system specifically, a resource may be allocated based on levels of constraints in the subsystem hierarchy that can be met. For example, a process may allocate resources from entries of process-specific constraints first before moving to entries with group-specific or subsystem-specific constraints. Once pre-allocations from process-specific entries have been depleted, the system may then move to subsystem-specific and group-specific constraints in that order.

If a shortfall is encountered, a subsequent request may be generated for each of the client systems 120, 122, 124 to allocate additional resources to the system. The request may be generated by dividing the total shortfall of resources amongst the client systems 120, 122, 124 based on the predefined percentages 126, 128, 130. New pre-allocations may be received as described above, and a record of these pre-allocations may be stored in the resource table 520.

FIG. 14 illustrates an update table 1400 that may be used to update the resource table 520, according to some embodiments. Entries in the update table 1400 may be generated automatically by the process described above in order to update the resource table 520 after resource allocations have been completed. Generally, when resources are actually allocated to a process, the remaining resource amount may need to be updated in the resource table 520. Recall that each entry in the resource table 520 corresponds to a specific pre-allocation event of resources by a specific one of the client systems. As resources are used, they may be deducted from any of the entries in the resource table 520 that fulfill the constraints as described above. For example, allocating resources to a process may include deducting a pro rata amount of resources from each of the available entries in the resource table with fulfilled constraints.

The resource table 520 is a data structure that records sources and uses of pre-allocated resources that are made available to the system. Thus, when resources are actually allocated to a process, the resource table 520 may need to be updated such that allocated resources may be properly attributed to client systems. To keep the resource table 520 updated, each allocation of resources to a process may automatically generate an entry in the update table 1400 reflecting a change that should be made to a corresponding entry in the resource table 520. Entries in the update table 1400 may each indicate a change that should be made to a corresponding entry in the resource table 520. The system may process each entry in the update table 1400 individually to keep the pre-allocated resources in each entry of the resource table 524 up-to-date. In some embodiments, each entry in the update table 1400 may be considered a form of journal/log entry that indicates action taken in allocating resources that can be processed to update the resource table 520. Along with updating the resource table 520, the entries in the update table 1400 may be used to form a log of resource allocations.

For example, the update table 1400 in FIG. 14 includes three entries 1402, 1404, 1406. Each of these entries may be related to a single resource allocation event where resources were allocated directly from a general pool of pre-allocated resources available to the system and allocated directly to a specific process. In this example, three different pre-allocation entries in the resource table 520 may have fulfilled the constraints for allocating resources to the maintenance process indicated in field 1410. Note that the numerical values of "100," "250," and "1500" are used merely by way of example to illustrate how amounts of resources can be allocated to different processes. In some embodiments, the update table 1400 may represent a record of requests to allocate resources to specific processes. This request list may act as a log of received requests.

Specifically, entry 1402 had process-level constraints that were fulfilled by the maintenance process, and thus "100" resource units were allocated to the maintenance process. The identifier for entry 1402 of "61" may be attributed to a first client system that provided the pre-allocated resources to the system. Entry 1404 has an identifier of "72" that uniquely identifies the pre-allocation entry in the resource table 520. Entry 1404 may be attributed to the first client system or to a second client system that is different from the first client system. The constraints for entry 1404 have been fulfilled at the group level, and "250" resource units have been allocated to the process. Similarly, entry 1406 may be from a third client system, and its constraints may be fulfilled at the system level such that 1500 resources may be allocated to the process. Each of these entries 1402, 1404, 1406 may be logged and/or processed against entries in the resource table 520 such that there corresponding resource values are updated in the resource table 520. A single resource allocation may draw from the pool of pre-allocated resources and be attributed to any pre-allocation events provided by any available client system, even though the resource table 520 illustrated above has been simplified to show pre-allocation events from a single client system.

Some embodiments may also provide separate entries for tables that track resources allocated to particular processes. For example, entry 1410 may indicate the total amount of resources 1412 allocated to the process from each of the other entries 1402, 1404, 1406. This entry 1410 in the update table 1400 may be used to update an additional table that tracks resources allocated to particular processes.

Figure 15:
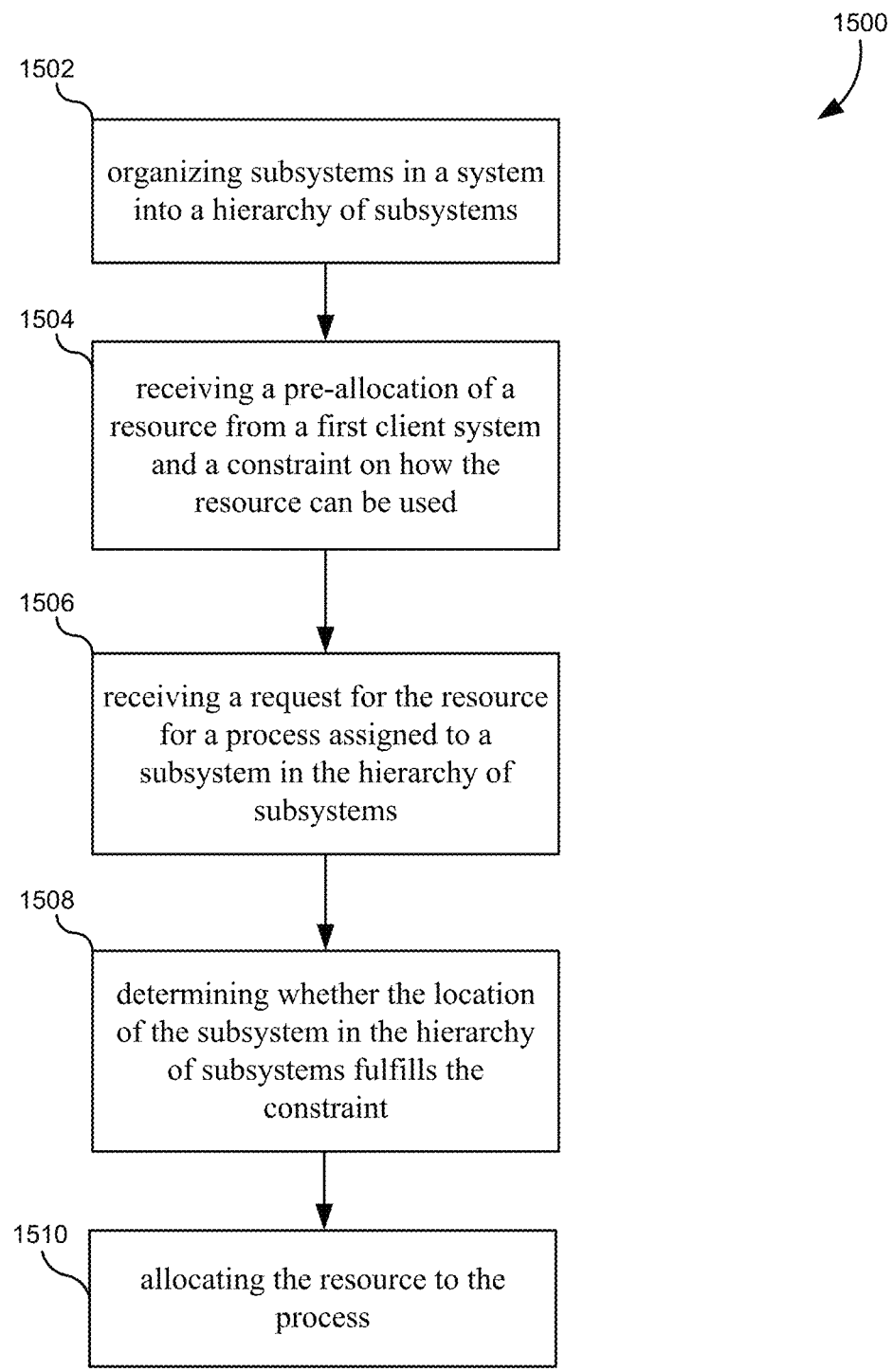
FIG. 15 illustrates a flowchart of a method of pre-allocating resources of hierarchy-based constraints, according to some embodiments.

FIG. 15 illustrates a flowchart 1500 of a method of pre-allocating resources of hierarchy-based constraints, according to some embodiments. The method may include organizing a plurality of subsystems in a system into a hierarchy of subsystems (1502). The hierarchy of subsystems may be organized such that existing relationships are converted into parent-child relationships to form a tree structure with the overall system as a root node. The hierarchy of subsystems may include processes that are assigned to specific subsystems and/or that are shared between subsystems. Subsystems may also be organized into groups that may be referenced by a top-most node of the group such that the group includes each descendant node of the top-most node of the group. Other groups need not include all descendant nodes. The hierarchy of subsystems may be organized as described above in FIGS. 1-4 and throughout this disclosure.

The method may also include receiving a pre-allocation of a resource from a first client system and a constraint on how the resource may be used (1504). The constraint may indicate a portion of the hierarchy of subsystems that can use the resource. The pre-allocation may be stored as an entry in a table, where fields in the table correspond to each level of the constraint corresponding to levels in the hierarchy of subsystems. This may include process-level constraints, subsystem-level constraints, group-level constraints, system-level constraints, and so forth. The client system may provide resources to be pre-allocated in response to a call for resources based on a predicted or known resource need for a particular process in the future. Multiple client systems may respond by submitting resources based on predefined percentages to be pre-allocated initially to the system generally, and later specifically allocated to a particular process. Resources may be pre-allocated as described above in FIG. 1, FIGS. 5-8, and throughout this disclosure.

The method may additionally include receiving a request for the resource for a process assigned to a subsystem in the hierarchy of subsystems (1506). The request for the actual allocation resources may be process-specific. Resources may be allocated from a general pool of resources that were pre-allocated to the system as a whole, and which are now being specifically allocated to a specific process. The request for actual resource allocations may be received and processed as described above in FIGS. 9-13 and throughout this disclosure.

The method may further include determining whether the location of the process in the hierarchy of subsystem fulfills the constraint (1508). The algorithm described above may be used to sequentially process each constraint level in a resource table that lists each of the pre-allocations of resources. Each entry may be sequentially processed beginning at a lowest-level constraint and continuing through each subsequent constraint level until the highest constraint level is reached or a constraint is fulfilled/failed. If a current-level constraint is failed, further processing on that entry may cease. If a current-level constraint is passed, then resources corresponding to the entry may be approved for allocation and processing on that entry may cease. If a current-level constraint is empty or otherwise null, then processing may continue to a next-level constraint in the constraint hierarchy. Determining if constraints are fulfilled may be executed as described above in FIGS. 9-13 and throughout this disclosure.

The method may also include allocating the resource to the process (1510). Resources may be allocated in response to determining that the location of the process in the hierarchy of subsystems fulfills the constraint as described above. Resources may be allocated from a plurality of different pre-allocations in the resource table, and may be distributed according to predefined percentages or other criteria. In cases where insufficient resources have been pre-allocated to the system, an additional call for pre-allocated resources may be made to each of the client systems using the same predefined percentages described above. Some embodiments may generate entries in a separate data structure, such as an update table that logs each of the actual resource allocations. Entries in this table can later be process to update remaining pre-allocated amounts of resources for each entry in the resource table. Resources may be allocated as described above in FIGS. 13-14 and throughout this disclosure.

It should be appreciated that the specific steps illustrated in FIG. 15 provide particular methods of pre-allocating resources with hierarchy-based constraints according to various embodiments. Other sequences of steps may also be performed according to alternative embodiments. For example, alternative embodiments may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. Many variations, modifications, and alternatives also fall within the scope of this disclosure.

The combination of specific steps described above in FIG. 15 solve a number of different technical problems and represent an improvement in the functioning of both the software and the hardware of computer systems. Prior to this disclosure, client systems could allocate resources in response to an immediate need. However, this resulted in a delay between a time when the resources were needed and when they became available to the system. Pre-allocating the resources reduces the latency between when a request for resources is made by a particular process and when the resources can actually be allocated to the process. This results in a reduction in the time spent waiting for resources become available. It also allows processes to be carried out without waiting for resources or for constraints to be verified.

Another technical problem involved evenly distributing resource requirements to client systems. It is generally more efficient to pool resources in an available pool for the system than to segregate resources based on client systems providing those resources before they are allocated to specific processes. This allows the system to freely transfer resources to a process from a general pool. However, this often leads to disproportionate requests for resources from different systems and insufficient logs of how resources are used after they are pre-allocated. These embodiments solve this technical problem by allowing resources to be pooled and pre-allocated such that they can be distributed efficiently, while still maintaining a complete log of how resources are allocated and utilized that is automatically generated based on pre-allocations and allocations of resources. In effect, the system generates and enforces constraints and allocation records as an automatic side effect of the actual resource usage. This improves the functioning of the computer system by ensuring that no client system is disproportionately overloaded with requests for resource allocations. These embodiments also inherently load balance the requests to client systems based on predefined percentages and guarantee that the allocation of resources is proportional to those percentages.

Another technical problem in the art included the efficient evaluation of constraints. Evaluating each constraint level for each individual entry is a process that grows in complexity with the size of the resource table and the number of constraints. For example, a resource table with 5000 entries and 8 constraint levels would require at least 40,000 evaluations of constraints. The embodiments described herein solve this technical problem and improve the functioning of the computer system by reducing the number of evaluations required for fully evaluating constraints. When a lower-level constraint passes or fails, processing on that entry may stop immediately, and resources can be allocated immediately if the constraint is fulfilled. Only rows with null entries may require additional passes through the resource table. The complexity of this algorithm remains virtually constant as the number of constraints increases.

Another technical problem in the art included generating an accurate log of resource allocations that can be used to update a table of pre-allocations. As described above, pooled resources can be more efficiently allocated in the system. However, once resources have been pooled, it was difficult to track the source of those resources and maintain a balance of pre-allocated resources according to predefined percentages for client systems. These environments solve this technical problem by improving the logging capabilities of the computer system to accurately maintain a virtual connection between resources that are pre-allocated from client systems with indistinguishable resources in a resource pool. This allows the system to efficiently allocate resources while automatically generating entries in the update table that can be processed later when the system is idle or bandwidth is otherwise available.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 16:
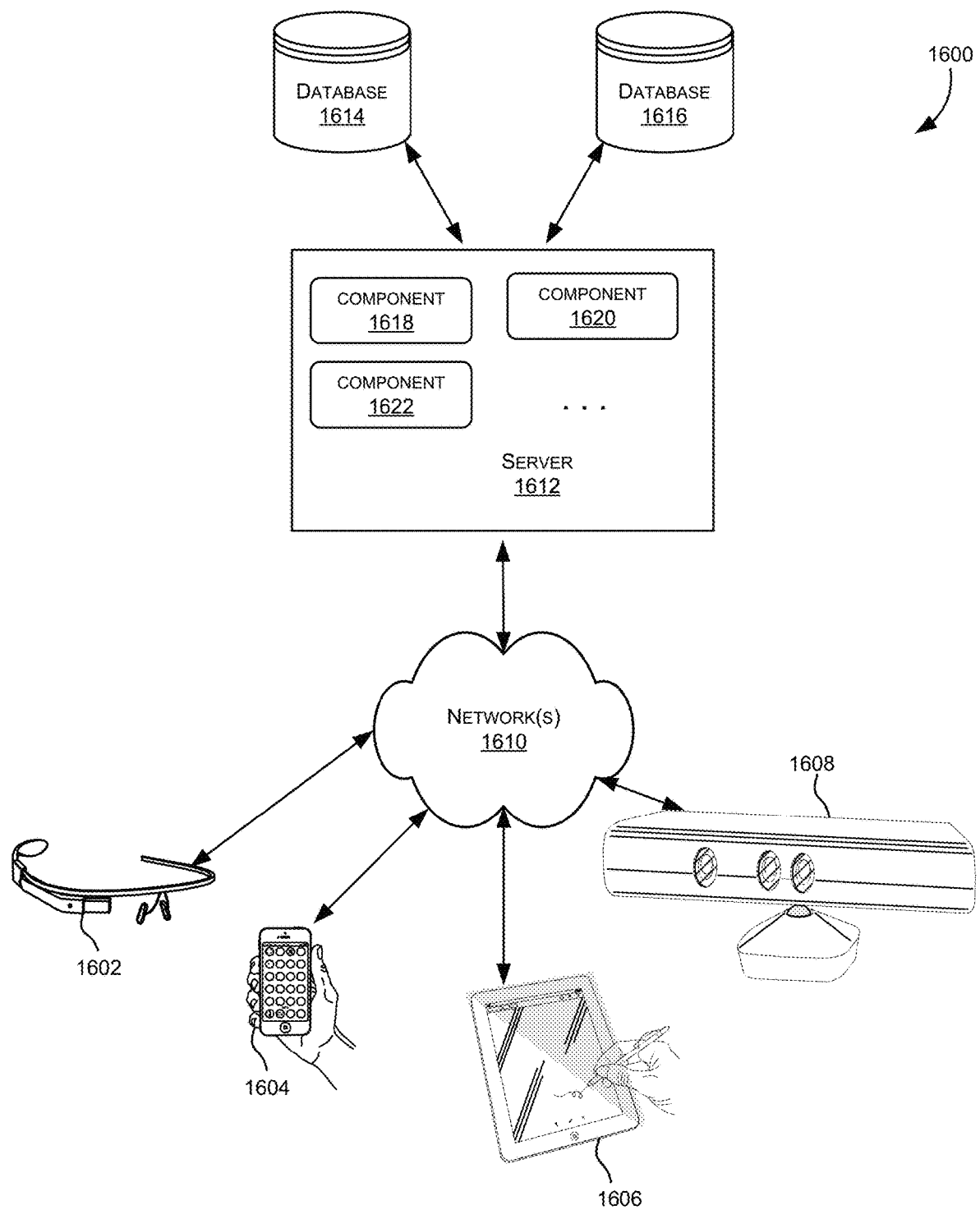
FIG. 16 illustrates a simplified block diagram of a distributed system for implementing some of the embodiments.

FIG. 16 depicts a simplified diagram of a distributed system 1600 for implementing one of the embodiments. In the illustrated embodiment, distributed system 1600 includes one or more client computing devices 1602, 1604, 1606, and 1608, which are configured to execute and operate a client application such as a web browser, proprietary client (e.g., Oracle Forms), or the like over one or more network(s) 1610. Server 1612 may be communicatively coupled with remote client computing devices 1602, 1604, 1606, and 1608 via network 1610.

In various embodiments, server 1612 may be adapted to run one or more services or software applications provided by one or more of the components of the system. In some embodiments, these services may be offered as web-based or cloud services or under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in the figure, the software components 1618, 1620 and 1622 of system 1600 are shown as being implemented on server 1612. In other embodiments, one or more of the components of system 1600 and/or the services provided by these components may also be implemented by one or more of the client computing devices 1602, 1604, 1606, and/or 1608. Users operating the client computing devices may then utilize one or more client applications to use the services provided by these components. These components may be implemented in hardware, firmware, software, or combinations thereof. It should be appreciated that various different system configurations are possible, which may be different from distributed system 1600. The embodiment shown in the figure is thus one example of a distributed system for implementing an embodiment system and is not intended to be limiting.

Client computing devices 1602, 1604, 1606, and/or 1608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1602, 1604, 1606, and 1608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1610.

Although exemplary distributed system 1600 is shown with four client computing devices, any number of client computing devices may be supported. Other devices, such as devices with sensors, etc., may interact with server 1612.

Network(s) 1610 in distributed system 1600 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1610 can be a local area network (LAN), such as one based on Ethernet, Token-Ring and/or the like. Network(s) 1610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1612 may be adapted to run one or more services or software applications described in the foregoing disclosure. For example, server 1612 may correspond to a server for performing processing described above according to an embodiment of the present disclosure.

Server 1612 may run an operating system including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more databases 1614 and 1616. Databases 1614 and 1616 may reside in a variety of locations. By way of example, one or more of databases 1614 and 1616 may reside on a non-transitory storage medium local to (and/or resident in) server 1612. Alternatively, databases 1614 and 1616 may be remote from server 1612 and in communication with server 1612 via a network-based or dedicated connection. In one set of embodiments, databases 1614 and 1616 may reside in a storage-area network (SAN). Similarly, any necessary files for performing the functions attributed to server 1612 may be stored locally on server 1612 and/or remotely, as appropriate. In one set of embodiments, databases 1614 and 1616 may include relational databases, such as databases provided by Oracle, that are adapted to store, update, and retrieve data in response to SQL-formatted commands.

Figure 17:
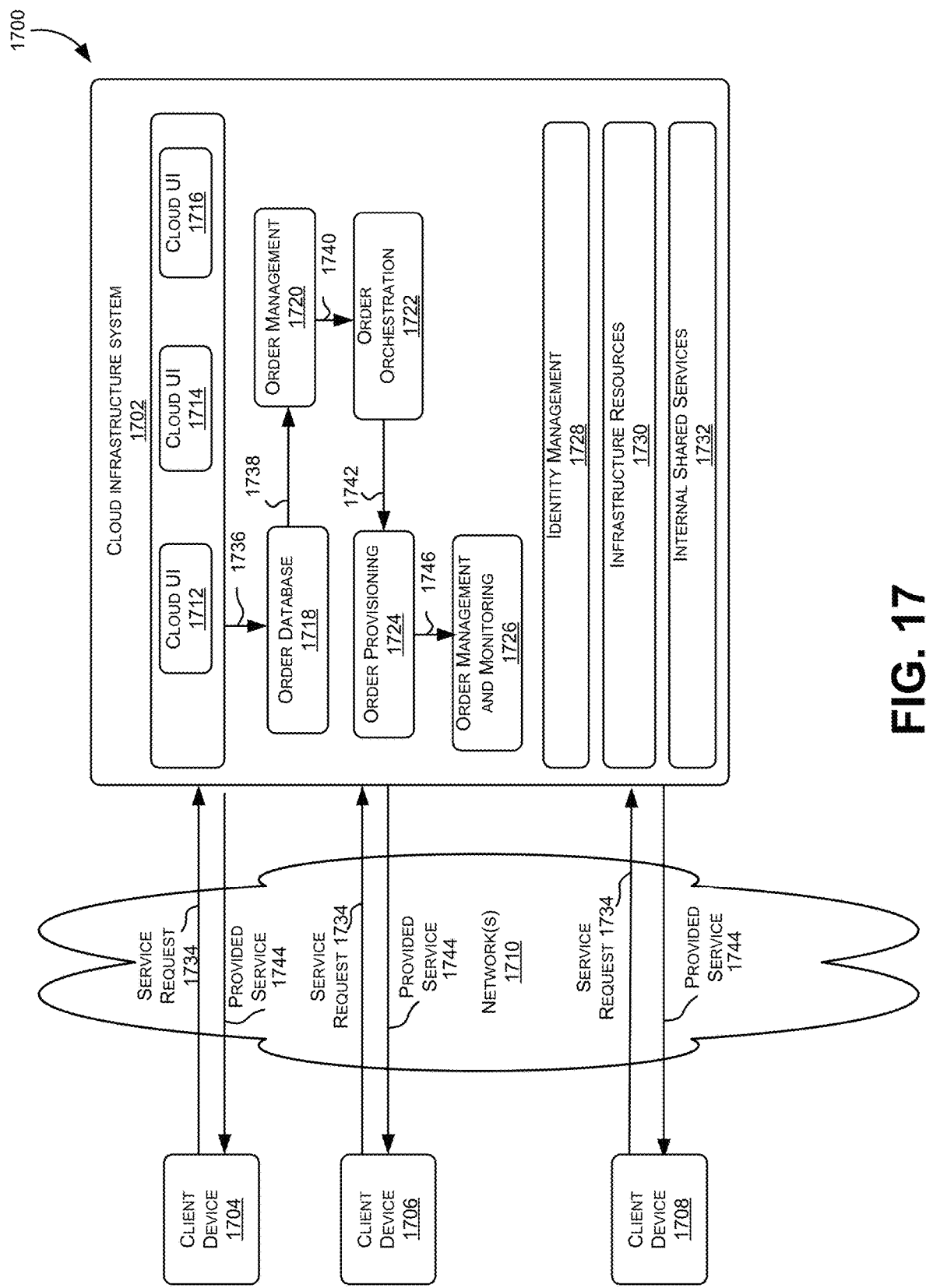
FIG. 17 illustrates a simplified block diagram of components of a system environment by which services provided by the components of an embodiment system may be offered as cloud services.

FIG. 17 is a simplified block diagram of one or more components of a system environment 1700 by which services provided by one or more components of an embodiment system may be offered as cloud services, in accordance with an embodiment of the present disclosure. In the illustrated embodiment, system environment 1700 includes one or more client computing devices 1704, 1706, and 1708 that may be used by users to interact with a cloud infrastructure system 1702 that provides cloud services. The client computing devices may be configured to operate a client application such as a web browser, a proprietary client application (e.g., Oracle Forms), or some other application, which may be used by a user of the client computing device to interact with cloud infrastructure system 1702 to use services provided by cloud infrastructure system 1702.

It should be appreciated that cloud infrastructure system 1702 depicted in the figure may have other components than those depicted. Further, the system shown in the figure is only one example of a cloud infrastructure system that may incorporate some embodiments. In some other embodiments, cloud infrastructure system 1702 may have more or fewer components than shown in the figure, may combine two or more components, or may have a different configuration or arrangement of components.

Client computing devices 1704, 1706, and 1708 may be devices similar to those described above for 1602, 1604, 1606, and 1608.

Although exemplary system environment 1700 is shown with three client computing devices, any number of client computing devices may be supported. Other devices such as devices with sensors, etc. may interact with cloud infrastructure system 1702.

Network(s) 1710 may facilitate communications and exchange of data between clients 1704, 1706, and 1708 and cloud infrastructure system 1702. Each network may be any type of network that can support data communications using any of a variety of commercially-available protocols, including those described above for network(s) 1610.

Cloud infrastructure system 1702 may comprise one or more computers and/or servers that may include those described above for server 1612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1702 may be adapted to automatically provision, manage and track a customer's subscription to services offered by cloud infrastructure system 1702. Cloud infrastructure system 1702 may provide the cloud services via different deployment models. For example, services may be provided under a public cloud model in which cloud infrastructure system 1702 is owned by an organization selling cloud services (e.g., owned by Oracle) and the services are made available to the general public or different industry enterprises. As another example, services may be provided under a private cloud model in which cloud infrastructure system 1702 is operated solely for a single organization and may provide services for one or more entities within the organization. The cloud services may also be provided under a community cloud model in which cloud infrastructure system 1702 and the services provided by cloud infrastructure system 1702 are shared by several organizations in a related community. The cloud services may also be provided under a hybrid cloud model, which is a combination of two or more different models.

In some embodiments, the services provided by cloud infrastructure system 1702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1702. Cloud infrastructure system 1702 then performs processing to provide the services in the customer's subscription order.

In some embodiments, the services provided by cloud infrastructure system 1702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1702 may also include infrastructure resources 1730 for providing the resources used to provide various services to customers of the cloud infrastructure system. In one embodiment, infrastructure resources 1730 may include pre-integrated and optimized combinations of hardware, such as servers, storage, and networking resources to execute the services provided by the PaaS platform and the SaaS platform.

In some embodiments, resources in cloud infrastructure system 1702 may be shared by multiple users and dynamically re-allocated per demand. Additionally, resources may be allocated to users in different time zones. For example, cloud infrastructure system 1730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1732 may be provided that are shared by different components or modules of cloud infrastructure system 1702 and by the services provided by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1702, and the like.

In one embodiment, as depicted in the figure, cloud management functionality may be provided by one or more modules, such as an order management module 1720, an order orchestration module 1722, an order provisioning module 1724, an order management and monitoring module 1726, and an identity management module 1728. These modules may include or be provided using one or more computers and/or servers, which may be general purpose computers, specialized server computers, server farms, server clusters, or any other appropriate arrangement and/or combination.

In exemplary operation 1734, a customer using a client device, such as client device 1704, 1706 or 1708, may interact with cloud infrastructure system 1702 by requesting one or more services provided by cloud infrastructure system 1702 and placing an order for a subscription for one or more services offered by cloud infrastructure system 1702. In certain embodiments, the customer may access a cloud User Interface (UI), cloud UI 1712, cloud UI 1714 and/or cloud UI 1716 and place a subscription order via these UIs. The order information received by cloud infrastructure system 1702 in response to the customer placing an order may include information identifying the customer and one or more services offered by the cloud infrastructure system 1702 that the customer intends to subscribe to.

After an order has been placed by the customer, the order information is received via the cloud UIs, 1712, 1714 and/or 1716.

At operation 1736, the order is stored in order database 1718. Order database 1718 can be one of several databases operated by cloud infrastructure system 1718 and operated in conjunction with other system elements.

At operation 1738, the order information is forwarded to an order management module 1720. In some instances, order management module 1720 may be configured to perform billing and accounting functions related to the order, such as verifying the order, and upon verification, booking the order.

At operation 1740, information regarding the order is communicated to an order orchestration module 1722. Order orchestration module 1722 may utilize the order information to orchestrate the provisioning of services and resources for the order placed by the customer. In some instances, order orchestration module 1722 may orchestrate the provisioning of resources to support the subscribed services using the services of order provisioning module 1724.

In certain embodiments, order orchestration module 1722 enables the management of business processes associated with each order and applies business logic to determine whether an order should proceed to provisioning. At operation 1742, upon receiving an order for a new subscription, order orchestration module 1722 sends a request to order provisioning module 1724 to allocate resources and configure those resources needed to fulfill the subscription order. Order provisioning module 1724 enables the allocation of resources for the services ordered by the customer. Order provisioning module 1724 provides a level of abstraction between the cloud services provided by cloud infrastructure system 1700 and the physical implementation layer that is used to provision the resources for providing the requested services. Order orchestration module 1722 may thus be isolated from implementation details, such as whether or not services and resources are actually provisioned on the fly or pre-provisioned and only allocated/assigned upon request.

At operation 1744, once the services and resources are provisioned, a notification of the provided service may be sent to customers on client devices 1704, 1706 and/or 1708 by order provisioning module 1724 of cloud infrastructure system 1702.

At operation 1746, the customer's subscription order may be managed and tracked by an order management and monitoring module 1726. In some instances, order management and monitoring module 1726 may be configured to collect usage statistics for the services in the subscription order, such as the amount of storage used, the amount data transferred, the number of users, and the amount of system up time and system down time.

In certain embodiments, cloud infrastructure system 1700 may include an identity management module 1728. Identity management module 1728 may be configured to provide identity services, such as access management and authorization services in cloud infrastructure system 1700. In some embodiments, identity management module 1728 may control information about customers who wish to utilize the services provided by cloud infrastructure system 1702. Such information can include information that authenticates the identities of such customers and information that describes which actions those customers are authorized to perform relative to various system resources (e.g., files, directories, applications, communication ports, memory segments, etc.) Identity management module 1728 may also include the management of descriptive information about each customer and about how and by whom that descriptive information can be accessed and modified.

Figure 18:
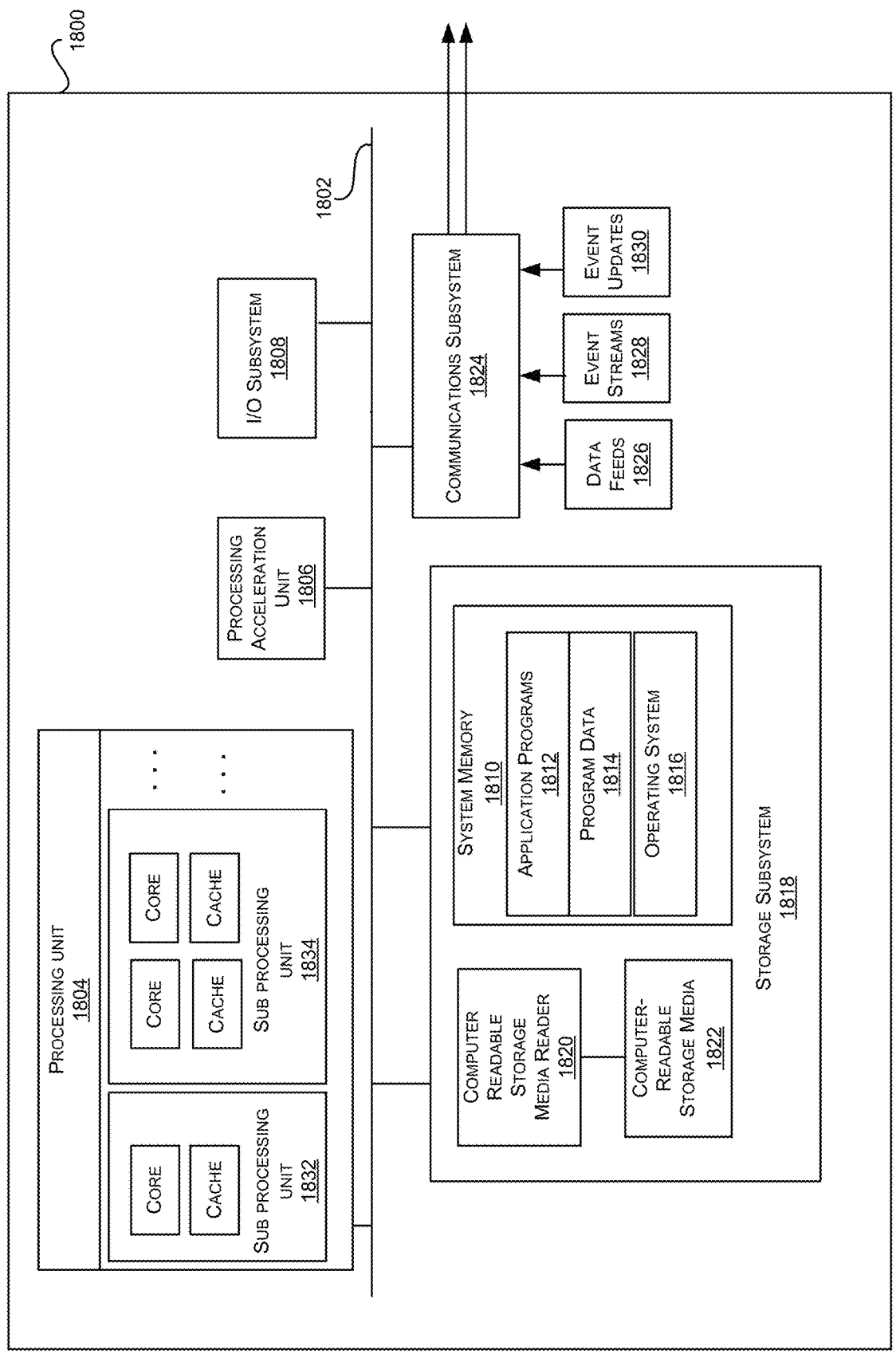
FIG. 18 illustrates an exemplary computer system, in which various embodiments may be implemented.

FIG. 18 illustrates an exemplary computer system 1800, in which various embodiments may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that comprises software elements, shown as being currently located within a system memory 1810. System memory 1810 may store program instructions that are loadable and executable on processing unit 1804, as well as data generated during the execution of these programs.

Depending on the configuration and type of computer system 1800, system memory 1810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 may include multiple different types of memory, such as static random access memory (SRAM) or dynamic random access memory (DRAM). In some implementations, a basic input/output system (BIOS), containing the basic routines that help to transfer information between elements within computer system 1800, such as during start-up, may typically be stored in the ROM. By way of example, and not limitation, system memory 1810 also illustrates application programs 1812, which may include client applications, Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1818 may also provide a tangible computer-readable storage medium for storing the basic programming and data constructs that provide the functionality of some embodiments. Software (programs, code modules, instructions) that when executed by a processor provide the functionality described above may be stored in storage subsystem 1818. These software modules or instructions may be executed by processing unit 1804. Storage subsystem 1818 may also provide a repository for storing data used in accordance with some embodiments.

Storage subsystem 1800 may also include a computer-readable storage media reader 1820 that can further be connected to computer-readable storage media 1822. Together and, optionally, in combination with system memory 1810, computer-readable storage media 1822 may comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

As described above, the embodiments presented herein may be applied to many different types of systems, subsystems, processes, and resources. In some embodiments, the system 102 may be comprised of a data structure or other computer representation of an organization. The subsystems may represent computer representations of organizations that fall within the larger system-level organization. For example, a system may be a joint venture or other organizational entity. The subsystems may represent different organizations that are formed under the joint venture, such as business units. The processes that are executed by the various subsystems may represent specific activities (e.g., maintenance, construction, code development, etc.) to which resources may be applied. In this example, resources may include equipment, funding, manpower, or any other resource that may be applied to an activity. For example, a capital resource may be applied to an account for a process to fund the activities of the process. Thus, the processes described above may represent accounts that are associated with real-world activities. A call for resources may comprise a funding call to various client systems operated by partners in a joint venture. The update table may be comprised of automatically generated journal entries that can update the resource table. The technology described below focuses on the computer algorithms and data structures used to efficiently handle the pre-allocation and allocation of resources based on constraints rather than focusing on a particular type of resource or type of system to which the technology may be applied.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
    organizing a plurality of subsystems in a system into a hierarchy of subsystems;
    receiving a pre-allocation of a resource from a first client system and a constraint on how the resource can be used, wherein the resource is provided by the first client system, wherein the constraint indicates a portion of the hierarchy of subsystems that can use the resource, wherein the resource is reserved to the portion of the hierarchy of subsystems without yet being allocated to any specific process in the portion of the hierarchy of subsystems;
    receiving a request for the resource for a process assigned to a subsystem in the hierarchy of subsystems;
    determining whether the location of the process in the hierarchy of subsystems fulfills the constraint; and
    in response to determining that the location of the process in the hierarchy of subsystems fulfills the constraint, allocating the resource to the process such that an amount of the resource is removed from the pre-allocation of the resource reserved to the portion of the hierarchy of subsystems and assigned to the process.

2. The non-transitory computer-readable medium of claim 1, wherein the operations further comprise:
    sending a request to a plurality of client systems to pre-allocate the resource to the system, wherein the request is based on a total resource expected to be used by a subsystem or process in the system, and individual requests to each of the plurality of client systems are based on percentage amounts assigned to each of the plurality of client systems.

3. The non-transitory computer-readable medium of claim 1, wherein the constraint identifies a specific process assigned to the subsystem for which the resource may be allocated.

4. The non-transitory computer-readable medium of claim 1, wherein the constraint identifies the subsystem such that the resource may be allocated to any process assigned to the subsystem.

5. The non-transitory computer-readable medium of claim 1, wherein the hierarchy of subsystems comprises one or more groups, wherein a group comprises a plurality of parent-child relationships within the hierarchy of subsystems that separates the group from other parent-child relationships in the hierarchy of subsystems.

6. The non-transitory computer-readable medium of claim 5, wherein the constraint identifies a group in the one or more groups such that the resource may be allocated to any process assigned to any subsystem in the group.

7. The non-transitory computer-readable medium of claim 1, wherein the constraint identifies the system such that the resource may be allocated to any process assigned to any subsystem in the system.

8. The non-transitory computer-readable medium of claim 1, wherein the operations further comprise:

storing a data structure comprising an entry for each pre-allocation of resources, wherein each entry comprises an amount of the resource that has been pre-allocated, and a hierarchy of constraints based on the constraint.

9. The non-transitory computer-readable medium of claim 8, wherein the hierarchy of constraints comprises a plurality of fields, wherein each of the plurality of fields corresponds to a dimension in the hierarchy of subsystems.

10. The non-transitory computer-readable medium of claim 9, wherein the plurality of fields comprises values for a system identifier, a group identifier, a subsystem identifier, and a process identifier.

11. The non-transitory computer-readable medium of claim 10, wherein determining whether the location of the process in the hierarchy of subsystems fulfills the constraint comprises evaluating each field in the plurality of fields of the hierarchy of constraints, beginning with the process identifier and moving sequentially to the system identifier to determine whether each field in the hierarchy of constraints is fulfilled.

12. The non-transitory computer-readable medium of claim 11, wherein a field in the hierarchy of constraints is fulfilled if the value of the field matches a corresponding value for the process or if the value of the field is null.

13. The non-transitory computer-readable medium of claim 1, wherein the operations further comprise:
automatically generating an entry in an update table indicating an amount of the resource used by the process.

14. The non-transitory computer-readable medium of claim 13, wherein the operations further comprise:
processing each entry in the update table to update an amount of resources still pre-allocated for the system after the process uses the resource.

15. The non-transitory computer-readable medium of claim 1, wherein the operations further comprise:
determining that the request for the resource requires an amount of the resource greater than what has been pre-allocated.

16. The non-transitory computer-readable medium of claim 15, wherein the operations further comprise:
generating requests to a plurality of client systems to allocate resources sufficient to provide the amount of the resource required by the process.

17. The non-transitory computer-readable medium of claim 1, wherein a constraint identifying a specific subsystem in the hierarchy of subsystems may be fulfilled by a process assigned to the specific subsystem, but may not be fulfilled by a process assigned to a child subsystem of the specific subsystem in the hierarchy of subsystems.

18. The non-transitory computer-readable medium of claim 1, wherein the constraint identifies a range of process identifiers that may fulfill the constraint.

19. A method of pre-allocating resources with hierarchy-based constraints, the method comprising:
organizing a plurality of subsystems in a system into a hierarchy of subsystems;
receiving a pre-allocation of a resource from a first client system and a constraint on how the resource can be used, wherein the resource is provided by the first client system, wherein the constraint indicates a portion of the hierarchy of subsystems that can use the resource, wherein the resource is reserved to the portion of the hierarchy of subsystems without yet being allocated to any specific process in the portion of the hierarchy of subsystems;
receiving a request for the resource for a process assigned to a subsystem in the hierarchy of subsystems;
determining whether the location of the process in the hierarchy of subsystems fulfills the constraint; and
in response to determining that the location of the process in the hierarchy of subsystems fulfills the constraint, allocating the resource to the process such that an amount of the resource is removed from the pre-allocation of the resource reserved to the portion of the hierarchy of subsystems and assigned to the process.

20. A system comprising:
one or more processors; and
one or more memory devices comprising instructions that, when executed by the one or more processors, cause the system to perform operations comprising:
organizing a plurality of subsystems in a system into a hierarchy of subsystems;
receiving a pre-allocation of a resource from a first client system and a constraint on how the resource can be used, wherein the resource is provided by the first client system, wherein the constraint indicates a portion of the hierarchy of subsystems that can use the resource, wherein the resource is reserved to the portion of the hierarchy of subsystems without yet being allocated to any specific process in the portion of the hierarchy of subsystems;
receiving a request for the resource for a process assigned to a subsystem in the hierarchy of subsystems;
determining whether the location of the process in the hierarchy of subsystems fulfills the constraint; and
in response to determining that the location of the process in the hierarchy of subsystems fulfills the constraint, allocating the resource to the process such that an amount of the resource is removed from the pre-allocation of the resource reserved to the portion of the hierarchy of subsystems and assigned to the process.

\* \* \* \* \*